United States Patent
Gasbarro et al.

(10) Patent No.: US 6,948,004 B2
(45) Date of Patent: Sep. 20, 2005

(54) HOST-FABRIC ADAPTER HAVING WORK QUEUE ENTRY (WQE) RING HARDWARE ASSIST (HWA) MECHANISM

(75) Inventors: Dominic J. Gasbarro, Forest Grove, OR (US); Brian M. Leitner, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 895 days.

(21) Appl. No.: 09/818,902

(22) Filed: Mar. 28, 2001

(65) Prior Publication Data

US 2002/0141424 A1 Oct. 3, 2002

(51) Int. Cl.$^7$ ............................................. H04L 12/00
(52) U.S. Cl. ........................ 709/250; 709/218; 709/225; 709/226; 709/232; 709/238; 709/249
(58) Field of Search ................................. 709/218, 225, 709/226, 232, 238, 249, 250

(56) References Cited

U.S. PATENT DOCUMENTS

| | | | | |
|---|---|---|---|---|
| 5,371,864 | A | * 12/1994 | Chuang | 712/206 |
| 6,427,180 | B1 | * 7/2002 | Bastian et al. | 710/112 |
| 6,601,148 | B2 | * 7/2003 | Beukema et al. | 711/153 |
| 6,625,768 | B1 | 9/2003 | Reohr, Jr. et al. | |
| 6,718,392 | B1 | * 4/2004 | Krause | 709/238 |
| 6,744,765 | B1 | * 6/2004 | Dearth et al. | 370/394 |
| 6,775,719 | B1 | 8/2004 | Leitner et al. | |
| 2002/0071450 | A1 | 6/2002 | Gasbarro et al. | |
| 2002/0184392 | A1 | 12/2002 | Parthasarathy et al. | |
| 2002/0191599 | A1 | 12/2002 | Parthasarathy et al. | |
| 2004/0151176 | A1 | 8/2004 | Burton et al. | |
| 2004/0151177 | A1 | 8/2004 | Burton et al. | |

OTHER PUBLICATIONS

Pending U.S. Appl. No. 09/671,707, entitled "Host–Fabric Adapter and Method of Connecting a Host System to a Channel–Based Switched Fabric in a Data Network", filed Sep. 28, 2000, P8327.

(Continued)

*Primary Examiner*—Jeffrey Gaffin
*Assistant Examiner*—M. Farooq
(74) *Attorney, Agent, or Firm*—Rob D. Anderson

(57) ABSTRACT

A host system is provided with one or more host-fabric adapters installed therein for connecting to a switched fabric of a data network. The host-fabric adapter may comprise at least one Micro-Engine arranged to establish connections and support data transfer operations, via a switched fabric, in response to work requests that cause instructions in a form of work queue elements "WQES" posted from a host system for said data transfer operations; and a work queue element "WQE" hardware assist "HWA" mechanism arranged to determine the starting address of each work queue element "WQE" based on queue pair (QP) context information needed for said Micro-Engine (ME) to process work requests for said data transfer operations.

19 Claims, 14 Drawing Sheets

OTHER PUBLICATIONS

Pending U.S. Appl. No. 09/603,957, entitled "Device to Receive, Buffer, and Transmit Packets of Data in a Packet Switching Network", filed Jun. 26, 2000 P8329.

Pending U.S. Appl. No. 10/842,752, entitled "Device to Receive, Buffer, and Transmit Packets of Data in a Packet Switching Network", filed May 10, 2004, P8329C.

Pending U.S. Appl. No. 09/608,645, entitled "Memory Utilization in a Network Interface", filed Jun. 30, 2002 P8330.

Pending U.S. Appl. No. 09/669,670, entitled "Host–Fabric Adapter and Method of Connecting a Host System to a Channel–Based Switched Fabric in a Data Network", filed Sep. 26, 2000 P9436.

Pending U.S. Appl. No. 09/672,711, entitled "Host–Fabric Adapter Having Hardware Assist Architecture and Method of Connecting a Host System to a Channel–Based Switched Fabric in a Data Network", filed Sep. 29, 2000 P9438.

Pending U.S. Appl. No. 09/698,188, entitled "Host–Fabric Adapter Having Hardware Assist Architecture and Method of Connecting a Host System to a Channel–Based Switched Fabric in a Data Network", filed Oct. 30, 2000 P9439.

Pending U.S. Appl. No. 09/698,166, entitled "Host–Fabric Adapter Having Memory Access Bandwidth Optimizing Smart Decoder", filed Oct. 30, 2000 P9440.

* cited by examiner

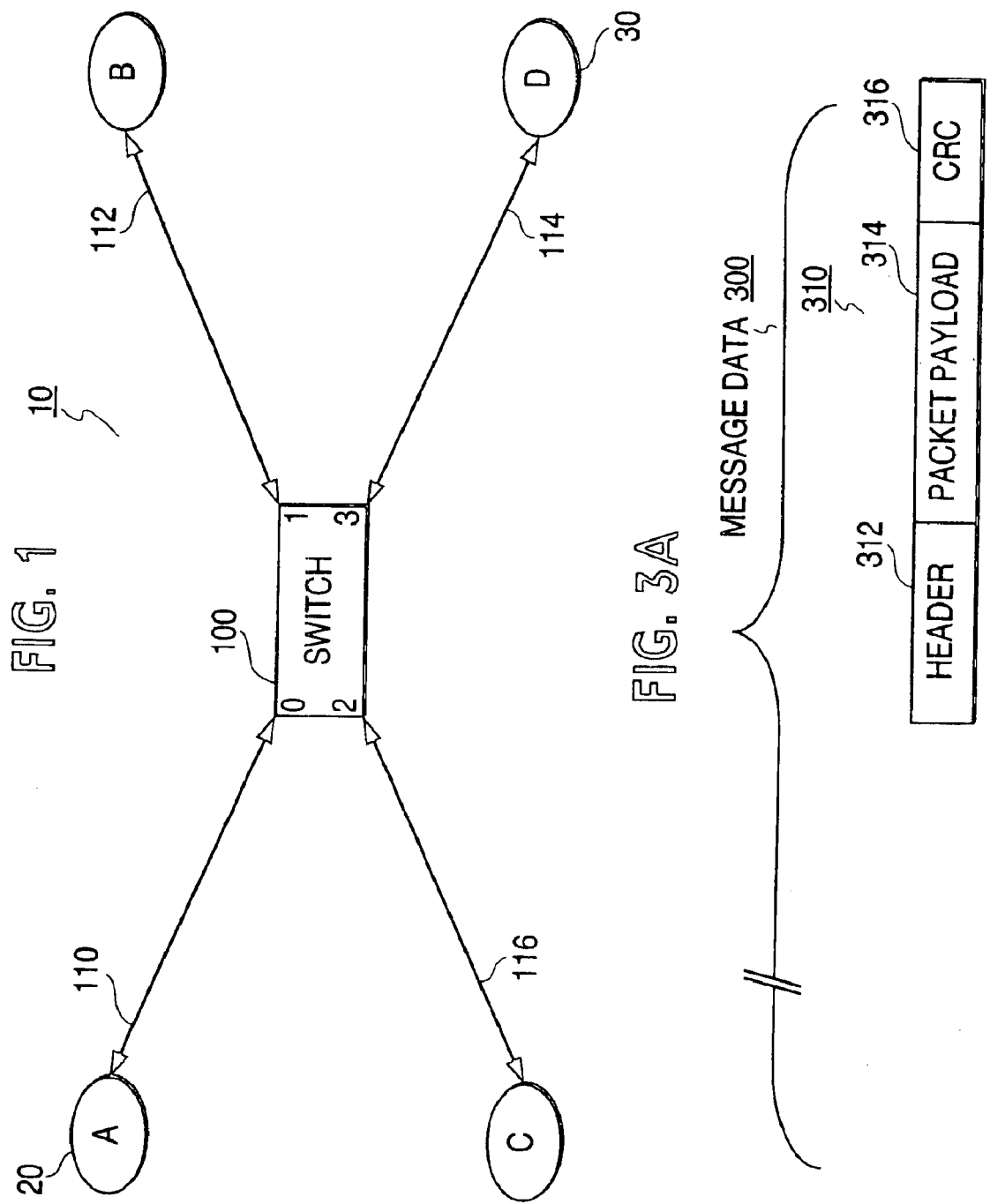

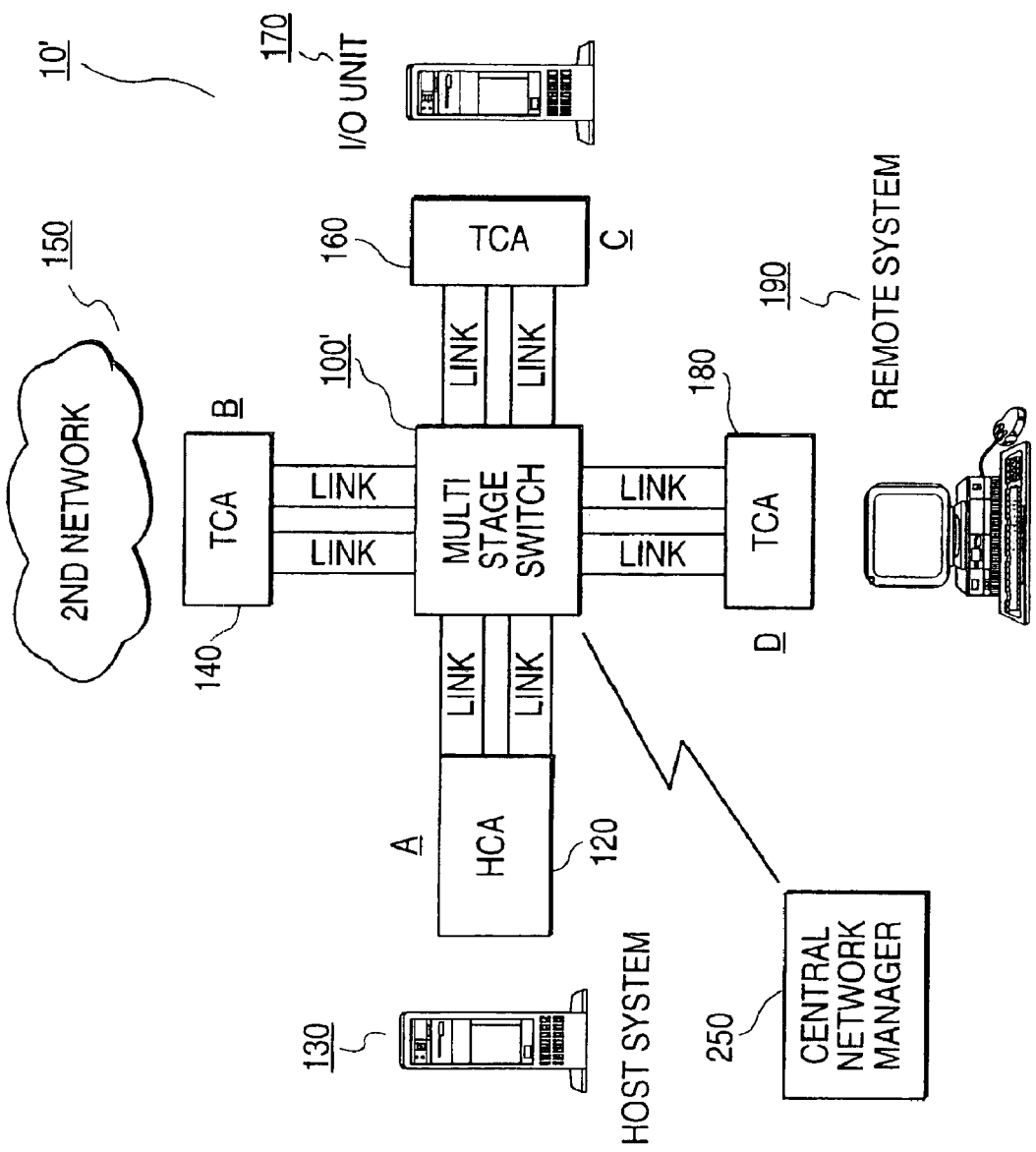

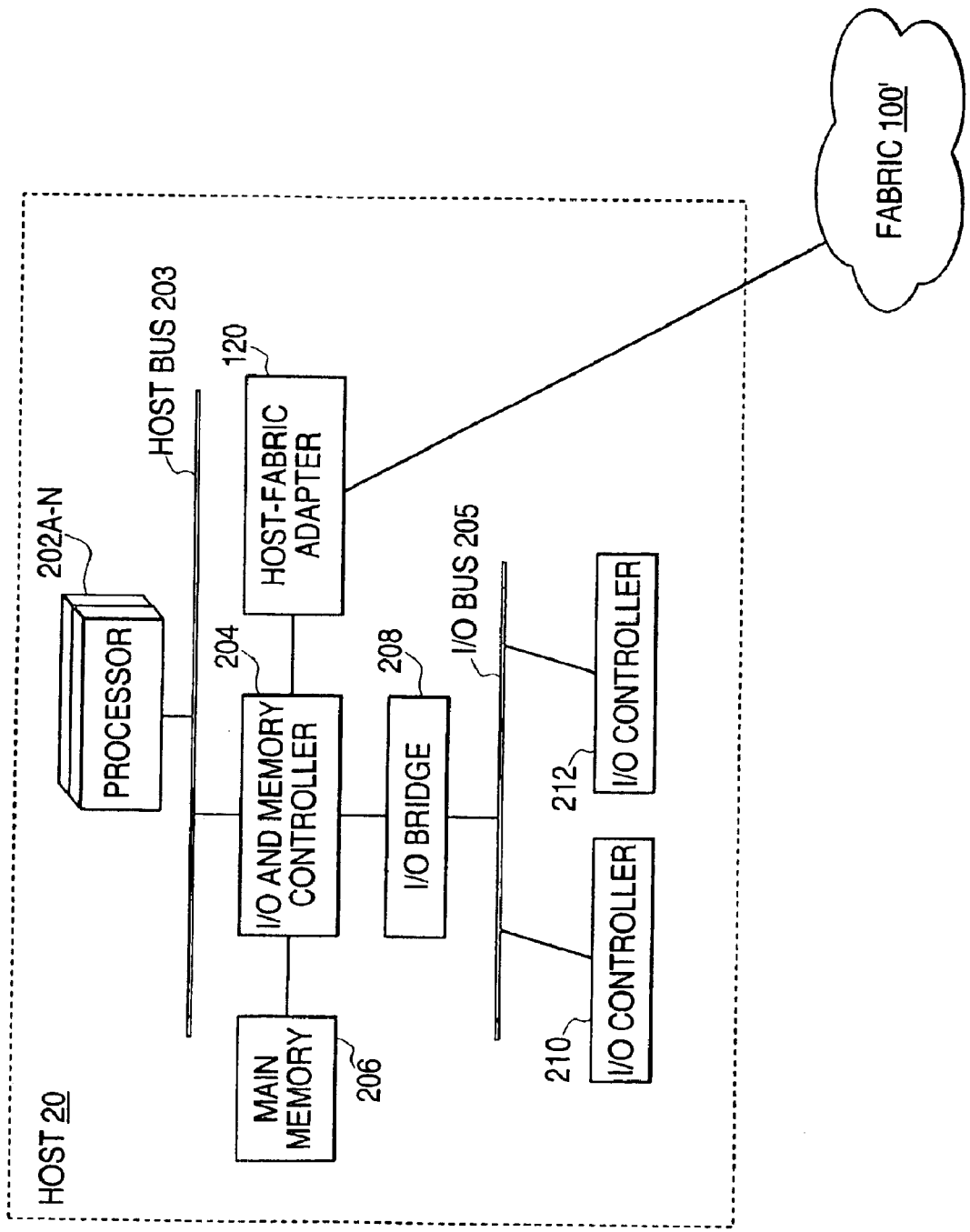

FIG. 12

```
 31                          11                        1200              0
┌──────────────────────────────┬────────────────────────────┐
│           ONES               │    WORK REQUEST MASK       │
└──────────────────────────────┴────────────────────────────┘
                        WQE MASK REGISTER
```

| TWO BIT WQE SIZE (FILED FROM HOST) | NUMBER OF DATA SEGMENTS | WORK REQUEST MASK VALUE |
|---|---|---|
| 00 | 1 | 111111000000 |
| 01 | 5 | 111110000000 |
| 10 | 13 | 111100000000 |
| 11 | 29 | 111000000000 |

FIG. 13

```
 31                          11                        1300              0
┌──────────────────────────────┬────────────────────────────┐
│           ZERO               │    WORK REQUEST SIZE       │
└──────────────────────────────┴────────────────────────────┘
                        WQE SIZE REGISTER
```

| TWO BIT WQE SIZE (FILED FROM HOST) | NUMBER OF DATA SEGMENTS | WORK REQUEST SIZE VALUE |
|---|---|---|
| 00 | 1 | 000001000000 |
| 01 | 5 | 000010000000 |
| 10 | 13 | 000100000000 |
| 11 | 29 | 001000000000 | ent
HOST-FABRIC ADAPTER HAVING WORK QUEUE ENTRY (WQE) RING HARDWARE ASSIST (HWA) MECHANISM

TECHNICAL FIELD

The present invention relates to a data network, and more particularly, relates to a host-fabric adapter having a work queue entry ("WQE") ring hardware assist (HWA) mechanism for determining the starting address of each WQE regardless of the number of data segments for data transaction operations in such a data network.

BACKGROUND

A data network generally consists of a network of multiple independent and clustered nodes connected by point-to-point links. Each node may be an intermediate node, such as a switch/switch element, a repeater, and a router, or an end-node within the network, such as a host system and an I/O unit (e.g., data servers, storage subsystems and network devices). Message data may be transmitted from source to destination, often through intermediate nodes.

Existing interconnect transport mechanisms, such as PCI (Peripheral Component Interconnect) buses as described in the "*PCI Local Bus Specification, Revision* 2.1" set forth by the PCI Special Interest Group (SIG) on Jun. 1, 1995, may be utilized to deliver message data to and from I/O devices, namely storage subsystems and network devices via a data network. However, PCI buses utilize a shared memory-mapped bus architecture that includes one or more shared I/O buses to deliver message data to and from storage subsystems and network devices. Shared I/O buses can pose serious performance limitations due to the bus arbitration required among storage and network peripherals as well as posing reliability, flexibility and scalability issues when additional storage and network peripherals are required. As a result, existing interconnect technologies have failed to keep pace with computer evolution and the increased demands generated and burden imposed on server clusters, application processing, and enterprise computing created by the rapid growth of the Internet.

Emerging solutions to the shortcomings of existing PCI bus architecture are InfiniBand™ and its predecessor, Next Generation I/O (NGIO) which have been developed by Intel Corp. and other companies to provide a standards-based I/O platform that uses a switched fabric and separate I/O channels instead of a shared memory-mapped bus architecture for reliable data transfers between end-nodes in a data network, as set forth in the "*Next Generation Input/Output (NGIO) Specification*," NGIO Forum on Jul. 20, 1999 and the "*InfiniBand™ Architecture Specification*," the InfiniBand™ Trade Association on Oct. 24, 2000. Using NGIO/InfiniBand™, a host system may communicate with one or more remote systems using a Virtual Interface (VI) architecture in compliance with the "*Virtual Interface (VI) Architecture Specification, Version* 1.0," as set forth by Compaq Corp., Intel Corp., and Microsoft Corp., on Dec. 16, 1997. NGIO/InfiniBand™ and VI hardware and software may often be used to support data transfers between two memory regions, typically on different systems over one or more designated channels. Each host system using a VI Architecture may contain VIs, also known as work queue pairs (WQPs) in which work requests (WRs) are posted to describe data movement operation and location of data to be moved for processing and/or transportation via a data network. Each host system may serve as a source (initiator) system which initiates a message data transfer (send) or a target system of a message passing operation (receive). Work requests submitted from a consumer that cause work instructions, called Work Queue Elements ("WQEs"), to be posted on work queues associated with a given network interface card for data transfer operations such as send/receive operations and remote direct memory access "RDMA" read/write operations. One or more channels between communication devices at host systems via a data network may be created and managed so that requested operations can be performed.

Since NGIO/InfiniBand™ is an emerging interconnect technology not yet in the marketplace, there is no known interface mechanism specifically implemented for NGIO/InfiniBand™ applications. More specifically, there is no known network interface card for a host system to connect to a data network using a channel-based, switched fabric architecture to support data movement operations between communication devices at a host system or between host systems or via a data network. Existing network interface cards for host systems are not adapted for emerging NGIO/InfiniBand™ interconnect technology and are, therefore, not optimized for NGIO/InfiniBand™ functionality.

Accordingly, there is a need for an especially designed, performance-driven host-fabric adapter installed at a host system in a data network using a channel-based, switched fabric architecture for NGIO/InfiniBand™ applications. Also needed is a work queue entry ("WQE") ring hardware assist (HWA) mechanism for determining the starting address of each WQE regardless of the number of data segments for data transaction operations in such a data network.

BRIEF DESCRIPTION OF THE DRAWINGS

A more complete appreciation of exemplary embodiments of the present invention, and many of the attendant advantages of the present invention, will be readily appreciated as the same becomes better understood by reference to the following detailed description when considered in conjunction with the accompanying drawings in which like reference symbols indicate the same or similar components, wherein:

FIG. 1 illustrates an example data network having several nodes interconnected by corresponding links of a basic switch according to an embodiment of the present invention;

FIG. 2 illustrates another example data network having several nodes interconnected by corresponding links of a multi-stage switched fabric according to an embodiment of the present invention;

FIGS. 3A–3D illustrate packet formats of message data transmitted from a source node to a destination node and work requests in a form of "Work Queue Elements" (WQE) posted for data transfer operations in an example data network according to an embodiment of the present invention;

FIGS. 4A–4B illustrate a block diagram of an example host system of an example data network according to different embodiments of the present invention;

FIG. 12 illustrates an example WQE Mask Register according to an embodiment of the present invention.

FIG. 13 illustrates an example WQE Size Register according to an embodiment of the present invention.

DETAILED DESCRIPTION

Figure 3B:
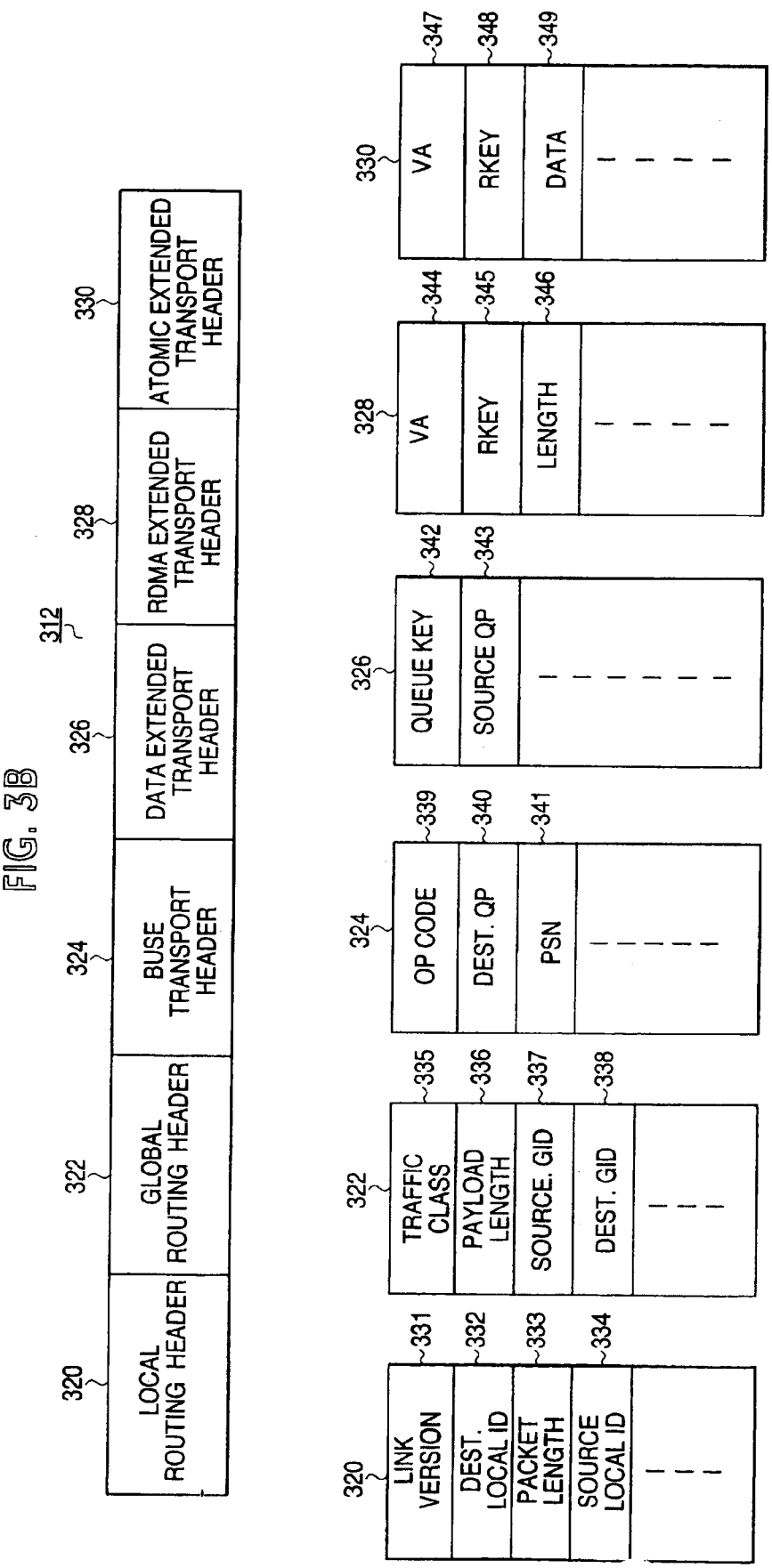

The present invention is applicable for use with all types of data networks, I/O hardware adapters and chipsets, including follow-on chip designs which link together end stations such as computers, servers, peripherals, storage subsystems, and communication devices for data communications. Examples of such data networks may include a local area network (LAN), a wide area network (WAN), a campus area network (CAN), a metropolitan area network (MAN), a global area network (GAN), a wireless personal area network (WPAN), and a system area network (SAN), including newly developed computer networks using Next Generation I/O (NGIO), Future I/O (FIO), InfiniBand™ and those networks including channel-based, switched fabric architectures which may become available as computer technology advances to provide scalable performance. LAN systems may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on a host system including one or more hardware fabric adapters for providing physical links for channel connections in a simple data network having several example nodes (e.g., computers, servers and I/O units) interconnected by corresponding links and switches, although the scope of the present invention is not limited thereto.

Attention now is directed to the drawings and particularly to FIG. 1, in which a simple data network 10 having several interconnected nodes for data communications according to an embodiment of the present invention is illustrated. As shown in FIG. 1, the data network 10 may include, for example, one or more centralized switches 100 and four different nodes A, B, C, and D. Each node (endpoint) may correspond to one or more I/O units and host systems including computers and/or servers on which a variety of applications or services are provided. I/O unit may include one or more processors, memory, one or more I/O controllers and other local I/O resources connected thereto, and can range in complexity from a single I/O device such as a local area network (LAN) adapter to large memory rich RAID subsystem. Each I/O controller (IOC) provides an I/O service or I/O function, and may operate to control one or more I/O devices such as storage devices (e.g., hard disk drive and tape drive) locally or remotely via a local area network (LAN) or a wide area network (WAN), for example.

The centralized switch 100 may contain, for example, switch ports 0, 1, 2, and 3 each connected to a corresponding node of the four different nodes A, B, C, and D via a corresponding physical link 110, 112, 114, and 116. Each physical link may support a number of logical point-to-point channels. Each channel may be a bi-directional communication path for allowing commands and data to flow between two connected nodes (e.g., host systems, switch/switch elements, and I/O units) within the network.

Each channel may refer to a single point-to-point connection where data may be transferred between endpoints (e.g., host systems and I/O units). The centralized switch 100 may also contain routing information using, for example, explicit routing and/or destination address routing for routing data from a source node (data transmitter) to a target node (data receiver) via corresponding link(s), and re-routing information for redundancy.

The specific number and configuration of endpoints or end stations (e.g., host systems and I/O units), switches and links shown in FIG. 1 is provided simply as an example data network. A wide variety of implementations and arrangements of a number of end stations (e.g., host systems and I/O units), switches and links in all types of data networks may be possible.

According to an example embodiment or implementation, the endpoints or end stations (e.g., host systems and I/O units) of the example data network shown in FIG. 1 may be compatible with the "*Next Generation Input/Output (NGIO) Specification*" as set forth by the NGIO Forum on Jul. 20, 1999, and the "*InfiniBand™ Architecture Specification*" as set forth by the InfiniBand™ Trade Association on Oct. 24, 2000. According to the NGIO/InfiniBand™ specification, the switch 100 may be an NGIO/InfiniBand™ switched fabric (e.g., collection of links, routers, switches and/or switch elements connecting a number of host systems and I/O units), and the endpoint may be a host system including one or more host channel adapters (HCAs), or a remote system such as an I/O unit including one or more target channel adapters (TCAs). Both the host channel adapter (HCA) and the target channel adapter (TCA) may be broadly considered as fabric adapters provided to interface endpoints to the NGIO/InfiniBand™ switched fabric 100, and may be implemented in compliance with "*Next Generation I/O Link Architecture Specification: HCA Specification, Revision 1.0*" as set forth by NGIO Forum on May 13, 1999, and/or the *InfiniBand™ Specification* for enabling the endpoints (nodes) to communicate to each other over an NGIO/InfiniBand™ channel(s) with minimum data transfer rates of up to 2.5 gigabit per second (Gbps), for example.

For example, FIG. 2 illustrates an example data network (i.e., system area network SAN) 10' using an NGIO/InfiniBand™ architecture to transfer message data from a source node to a destination node according to an embodiment of the present invention. As shown in FIG. 2, the data network 10' includes an NGIO/InfiniBand™ switched fabric 100' (multi-stage switched fabric comprised of a plurality of switches) for allowing a host system and a remote system to communicate to a large number of other host systems and remote systems over one or more designated channels. A channel connection is simply an abstraction that is established over a switched fabric 100' to allow two work queue pairs (WQPs) at source and destination endpoints (e.g., host and remote systems, and IO units that are connected to the switched fabric 100') to communicate to each other. Each channel can support one of several different connection semantics. Physically, a channel may be bound to a hardware port of a host system. Each channel may be acknowledged or unacknowledged. Acknowledged channels may provide reliable transmission of messages and data as well as information about errors detected at the remote end of the channel. Typically, a single channel between the host system and any one of the remote systems may be sufficient but data transfer spread between adjacent ports can decrease latency and increase bandwidth. Therefore, separate channels for separate control flow and data flow may be desired. For example, one channel may be created for sending request and reply messages. A separate channel or set of channels may be created for moving data between the host system and any one of the remote systems. In addition, any number of end stations, switches and links may be used for relaying data in groups of packets between the end stations and switches via corresponding NGIO/InfiniBand™ links.

For example, node A may represent a host system 130 such as a host computer or a host server on which a variety of applications or services are provided. Similarly, node B may represent another network 150, including, but may not be limited to, local area network (LAN), wide area network (WAN), Ethernet, ATM and fibre channel network, that is connected via high speed serial links. Node C may represent an I/O unit 170, including one or more I/O controllers and I/O units connected thereto. Likewise, node D may represent a remote system 190 such as a target computer or a target server on which a variety of applications or services are provided. Alternatively, nodes A, B, C, and D may also represent individual switches of the NGIO/InfiniBand™ switched fabric 100' which serve as intermediate nodes between the host system 130 and the remote systems 150, 170 and 190.

The multi-stage switched fabric 100' may include a fabric manager 250 connected to all the switches for managing all network management functions. However, the fabric manager 250 may alternatively be incorporated as part of either the host system 130, the second network 150, the I/O unit 170, or the remote system 190 for managing all network management functions. In either situation, the fabric manager 250 may be configured for learning network topology, determining the switch table or forwarding database, detecting and managing faults or link failures in the network and performing other network management functions.

Host channel adapter (HCA) 120 may be used to provide an interface between a memory controller (not shown) of the host system 130 (e.g., servers) and a switched fabric 100' via high speed serial NGIO/InfiniBand™ links. Similarly, target channel adapters (TCA) 140 and 160 may be used to provide an interface between the multi-stage switched fabric 100' and an I/O controller (e.g., storage and networking devices) of either a second network 150 or an I/O unit 170 via high speed serial NGIO/InfiniBand™ links. Separately, another target channel adapter (TCA) 180 may be used to provide an interface between a memory controller (not shown) of the remote system 190 and the switched fabric 100' via high speed serial NGIO/InfiniBand™ links. Both the host channel adapter (HCA) and the target channel adapter (TCA) may be broadly considered as fabric adapters provided to interface either the host system 130 or any one of the remote systems 150, 170 and 190 to the switched fabric 100', and may be implemented in compliance with "Next Generation I/O Link Architecture Specification: HCA Specification, Revision 1.0" as set forth by NGIO Forum on May 13, 1999 for enabling the endpoints (nodes) to communicate to each other over an NGIO/InfiniBand™ channel(s). However, NGIO/InfiniBand™ is merely one example embodiment or implementation of the present invention, and the invention is not limited thereto. Rather, the present invention may be applicable to a wide variety of any number of data networks, hosts and I/O units. For example, practice of the invention may also be made with Future Input/Output (FIO). FIO specifications have not yet been released, owing to subsequent merger agreement of NGIO and FIO factions combine efforts on InfiniBand™ Architecture specifications as set forth by the InfiniBand Trade Association (formed Aug. 27, 1999) having an Internet address of "http://www.InfiniBandta.org."

FIGS. 3A–3B illustrate an embodiment of packet formats of message data transmitted from a source node (data transmitter) to a destination node (data receiver) through switches and/or intermediate nodes according to the "*InfiniBand™ Architecture Specification*" as set forth by the InfiniBandT™ Trade Association on Oct. 24, 2000. As shown in FIG. 3A, a message data 300 may represent a sequence of one or more data packets 310 (typically derived from data transfer size defined by a work request). Each packet 310 may include a header information 312, a variable format packet payload 314 and a cyclic redundancy check (CRC) information 316. Under the "*Next Generation Input/Output (NGIO) Specification*" as previously set forth by the NGIO Forum on Jul. 20, 1999, the same data packets may be referred to as data cells having similar header information as the least common denominator (LCD) of message data. However, NGIO header information may be less inclusive than InfiniBand™ header information. Nevertheless, for purposes of this disclosure, data packets are described herein below via InfiniBand™ protocols but are also interchangeable with data cells via NGIO protocols.

The header information 312 according to the InfiniBand™ specification may include, as shown in FIG. 3B, different types of headers, including: for example, a local routing header 320, a global routing header 322, a base transport header 324 and extended transport headers such as data extended transport header 326, a RDMA extended transport header 328, and an Atomic extended transport header 330.

The local routing header 320 contains fields used for local routing by switches within the example data network 10' shown in FIG. 2. For example, the local routing header 320 may include, but not limited to, a link version field 331 used to identify the InfiniBand™ link level protocols, a destination local ID field 332 used to identify the destination port and data path in the data network 10'; a packet length field 333 used to identify the size of the data packet; and a source local ID 334 used to identify the source port (injection point).

The global routing header 322 contains fields used for routing data packets between nodes of the example data network 10' shown in FIG. 2. For example, the global routing header 322 may include, but not limited to, a traffic class field 335 used for communication with global service level; a payload length field 336 used to indicate the length of the packet in bytes; a source GID field 333 used to identify the global identifier (GID) for the port which injected the packet into the data network 10'; and a destination GID field 338 used to identify the GID for the port which will consume the packet from the data network 10'.

The base transport header 324 contains fields used for data message transports within the data network 10' shown in FIG. 2. For example, the base transport header 324 may include, but not limited to, an OpCode field 339 used to indicate the packet type, identify if the packet is the first, last, immediate or only packet of a data message and specifies the operation (Send, RDMA Write, RDMA Read, Atomic); a destination QP field 340 used to indicate the Work Queue Pair (WQP) number at the destination; a packet sequence number (PSN) field 341 used to detect a missing or duplicate packet.

The data extended transport header 326 contains additional transport fields for datagram service. For example, the data extended transport header 326 may include, but not limited to, a Queue Key (Q_Key) field 342 used to authorize access to the receive queue; and a source QP field 343 used to indicate the WQP number at the source.

The RDMA extended transport header 328 contains additional transport fields for RDMA operations. For example, the RDMA extended transport header 328 may include, but not limited to, a Virtual Address (VA) field 344 used to provide the Virtual Address of the RDMA operation; a Remote Key (Rkey) field 345 used to authorize access for the RDMA operation; and a length field 346 used to indicate the length (in bytes) for the direct memory access operation.

The Atomic extended transport header 330 contains additional transport fields for atomic packets and atomic operations. For example, the Atomic extended transport header 330 may include, but not limited to, a Virtual Address (VA) field 347 used to provide the remote Virtual Address, a Remote Key (Rkey) field 348 used to authorize access to the remote Virtual Address; and a swap and compare data field 349 used to provide operands in atomic operations.

Work requests submitted by a consumer in a form Work Queue Elements "WQEs" are posted onto appropriate work queues (WQs) from the host system 130 to describe data movement operation and location of data to be moved for processing and/or transportation, via the switched fabric 100'. Such "WQEs" typically provide all the information needed to complete Send Queue and Receive Queue operations.

There may be several classes of Send Queue operations, including Send, Remote Memory Access (RDMA), and Memory Binding. For a Send operation, the WQE specifies a block of data in the consumer's memory space for the hardware to send to the destination, letting a receive WQE already queued at the destination specify where to place that data. For an RDMA operation, the WQE also specifies the address in the remote consumer's memory. Thus an RDMA operation does not need to involve the receive work queue of the destination.

There are three types of RDMA operations, RMDA-Write, RDMA-Read, and Atomic. The RDMA-Write operation stipulates that the hardware is to transfer data from the consumer's memory to the remote consumer's memory. The RDMA-Read operation stipulates that the hardware is to transfer data from the remote memory to the consumer's memory. The Atomic operation stipulates that the hardware is to perform a read of a remote memory location. The remote system returns the value read, and conditionally modifies/replaces the remote memory contents by writing an updated value back to the same location. In other words, the Atomic operation is a combined Read, Modify, and Write operation. An example of an Atomic operation is the Compare and Swap if Equal operation. The WQE specifies a remote memory location, a compare value, and a new value. The remote WQP reads the specified memory location, compares that value to the compare value supplied in the message, and only if those values are equal, then the WQP writes the new value to the same memory location. In either case the remote WQP returns the value it read from the memory location to the requesting WQP. The other Atomic operation is the FetchAdd operation where the remote WQP reads the specified memory location, returns that value to the requesting WQP, adds to that value a value supplied in the message, and then writes the result to that same memory location.

The Memory Bind instructs the hardware to alter memory registration relationships and change the binding of a Memory Window. The Bind Memory Window operation associates a previously allocated Memory Window to a specified address range within an existing Memory Region, along with a specified set of remote access privileges.

There may be only one Receive Queue operation and it is to specify a receive data buffer. A Receive WQE specifies where the hardware is to place data received from another consumer when that consumer executes a Send operation. Each time the remote consumer successfully executes a Send operation, the hardware takes the next entry from the receive queue, places the received data in the memory location specified in that receive WQE, and places a completion queue entry on the completion queue (CQ) indicating to the consumer that the receive operation has completed. Thus the execution of a Send operation causes a receive queue operation at the remote consumer.

Each Send/Receive WQE may be utilized to control the transmission or reception of a single data packet. Send "WQEs" and RDMA Write "WQEs" additionally provide a "gather" list describing the virtual addresses to fetch outgoing data from local system memory 206 (that is to describe exactly where to fetch outgoing data from local system memory 206). Receive "WQEs" and RDMA Read "WQES" alternately provide a "scatter" list describing the virtual addresses to place incoming data in local system memory 206 (that is to describe exactly where to store incoming data within local system memory 206). Send "WQEs" are valid only on Send Work Queue chains. In contrast, receive "WQEs" are valid only on Receive Work Queue chains.

RDMA "WQEs" are a superset of Send/Receive "WQEs", and may contain additional information indicating the remote address of information transferred. Unlike Send/Receive operations where the remote system is also using a work request to determine where to transfer message data to or from, RDMA "WQEs" specifically instruct the remote system where to transfer the message data to or from, via the use of Virtual Address (VA), Memory Handle (MH) and Remote Key sent to the remote system. Remote Key may be used for virtual to physical address translations at the remote system.

Typically, each "WQE" may begin with a control segment followed by an optional address segment and an arbitrary number of data segments. Control segments may contain control and status information. Address segments, for read/write RDMA operations, may contain remote buffer information (i.e., memory associated with the VI targeted to receive the read/write request). Data segments, for both send/receive and read/write RDMA operations, may contain information about the local system memory 206 (i.e., memory associated with the VI issuing the send/receive or read/write request).

Figure 3C:
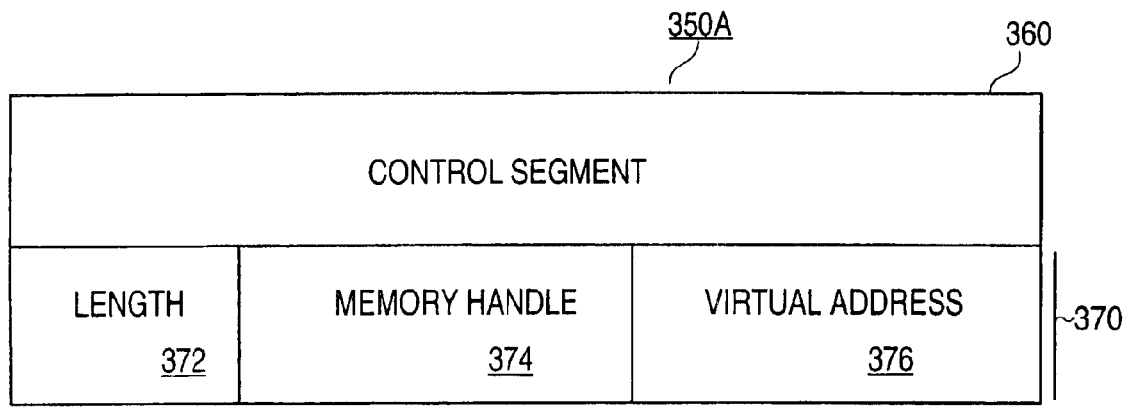
Figure 3D:
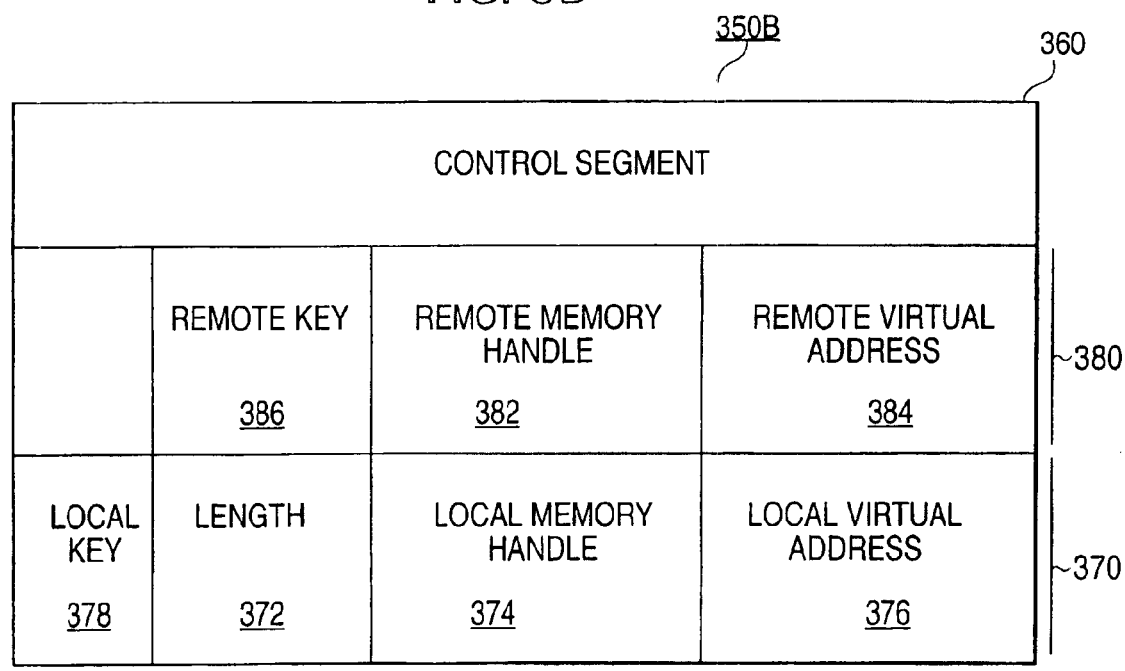

FIGS. 3C–3D illustrate an example Send/Receive type "WQE" 350A and an example Read/Write RDMA type "WQE" 350B respectively according to an embodiment of the present invention. As shown in FIG. 3C, the Send/

Receive "WQE" 350A may comprise a control segment 360 and a data segment 370 which includes a segment length field 372, a memory handle field 374, and a virtual address field 376. Segment length 372 specifies the length of the message data to be sent or that is to be received. Memory Handle (MH) 374 may be used to verify that the sending/requesting process (i.e., VI) owns the registered memory region indicated by segment length 372 and Virtual Address (VA) 376. In addition, Local Key 378 may be included to perform a locally generated virtual address to physical address translation. For a send operation, Virtual Address (VA) 376 identifies the starting memory location of the message data to be sent in the sending VI's local memory space. For a receive operation, Virtual Address (VA) 376 identifies the starting memory location of where the received message data is to be stored in the requesting VI's local memory space.

As shown in FIG. 3D, the Read/Write RDMA "WQE" 350B may comprise a control segment 360, an address segment 380, and a data segment 370. Address segment 380 may contain a remote memory handle field 382 and a remote virtual address field 384. Data segment 370 may contain a segment length field 372, a local memory handle field 374, and a local virtual address field 376. In addition, Local Key 378 may be included to perform a locally generated virtual address to physical address translation. Remote Key ("Rkey") 386 may also be included to perform a remotely generated virtual address to physical address translation at the remote system. More specifically, remote Key 386 refers to a Memory Region or Memory Window used with a virtual address to identify the appropriate page of local system memory 206 for the remote system to access local system memory 206.

For a RDMA read operation, remote Virtual Address (VA) 384 identifies the memory location in the remote process' memory space, of the message data to be read. Local Virtual Address (VA) 376 identifies the starting memory location in the local process' memory space of where the received message is to be placed. The amount of memory to be used to store the message data may be specified by segment length field 372. For a RDMA write operation, remote Virtual Address (VA) 384 identifies the memory location in the remote process' memory space of the message data to be written. Local Virtual Address (VA) 376 identifies the starting memory location in the local process' memory space of where the message data for the packet to be transferred is read from. The size of the message data is specified by segment length field 372. Remote Memory Handle (MH) 382 corresponds to the Memory Handle (MH) associated with the memory identified by remote Virtual Address (VA) 384. Local Memory Handle 374 corresponds to the Memory Handle (MH) associated with the memory identified by local Virtual Address 376.

Figure 4A:
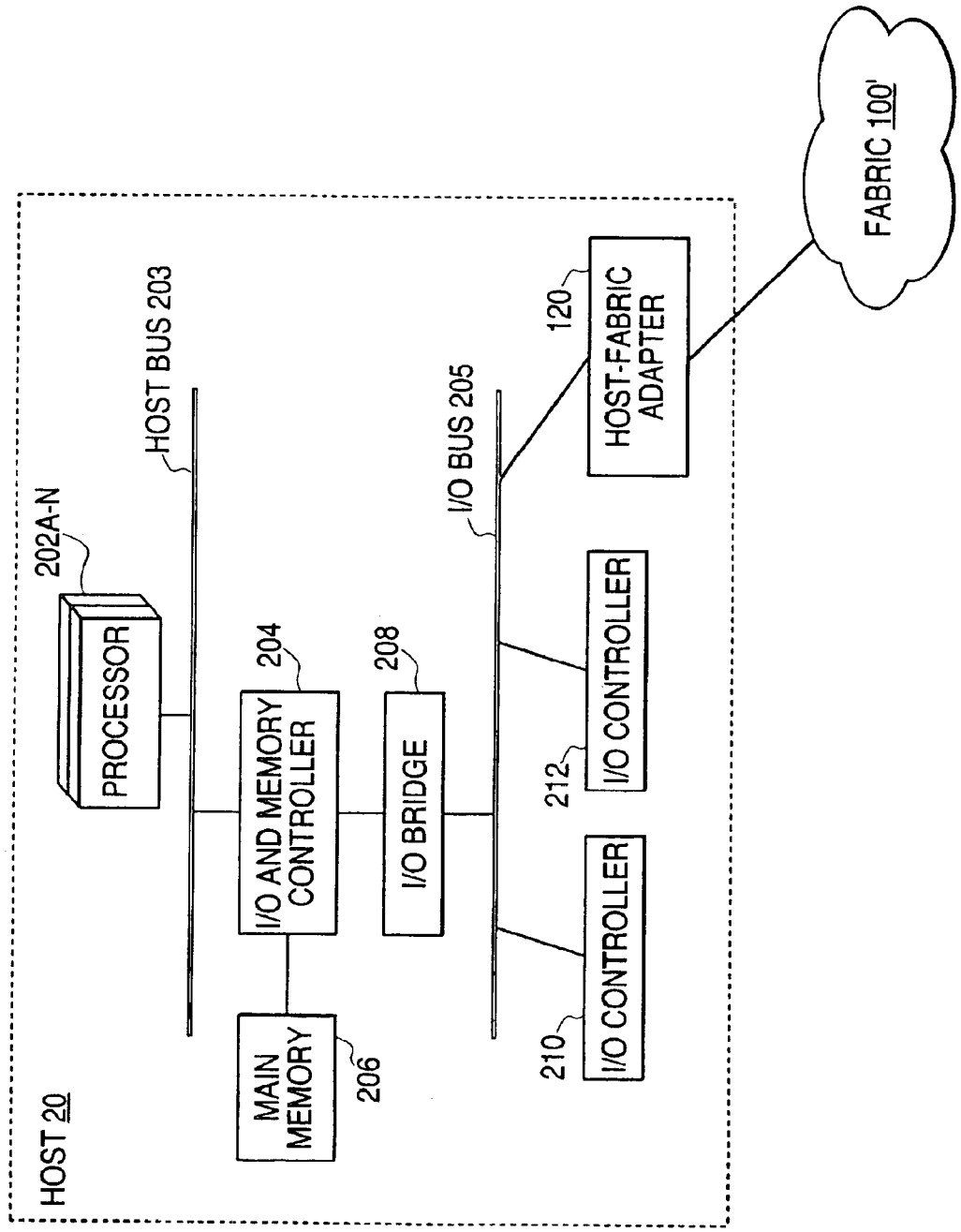

Returning to discussion, one example embodiment of a host system 130 may be shown in FIG. 4A. Referring to FIG. 4A, the host system 130 may include one or more processors 202A–202N coupled to a host bus 203. Each of the multiple processors 202A–202N may operate on a single item (I/O operation), and all of the multiple processors 202A–202N may operate on multiple items on a list at the same time. An I/O and memory controller 204 (or chipset) may be connected to the host bus 203. A main memory 206 may be connected to the I/O and memory controller 204. An I/O bridge 208 may operate to bridge or interface between the I/O and memory controller 204 and an I/O bus 205. Several I/O controllers may be attached to I/O bus 205, including an I/O controllers 210 and 212. I/O controllers 210 and 212 (including any I/O devices connected thereto) may provide bus-based I/O resources.

One or more host-fabric adapters 120 may also be connected to the I/O bus 205. Alternatively, one or more host-fabric adapters 120 may be connected directly to the I/O and memory controller (or chipset) 204 to avoid the inherent limitations of the I/O bus 205 as shown in FIG. 4B. In either embodiment shown in FIGS. 4A–4B, one or more host-fabric adapters 120 may be provided to interface the host system 130 to the NGIO/InfiniBand™ switched fabric 100'.

FIGS. 4A–4B merely illustrate example embodiments of a host system 130. A wide array of system configurations of such a host system 130 may be available. A software driver stack for the host-fabric adapter 120 may also be provided to allow the host system 130 to exchange message data with one or more remote systems 150, 170 and 190 via the NGIO/InfiniBand™ switched fabric 100', while preferably being compatible with many currently available operating systems, such as Windows 2000.

Figure 5:
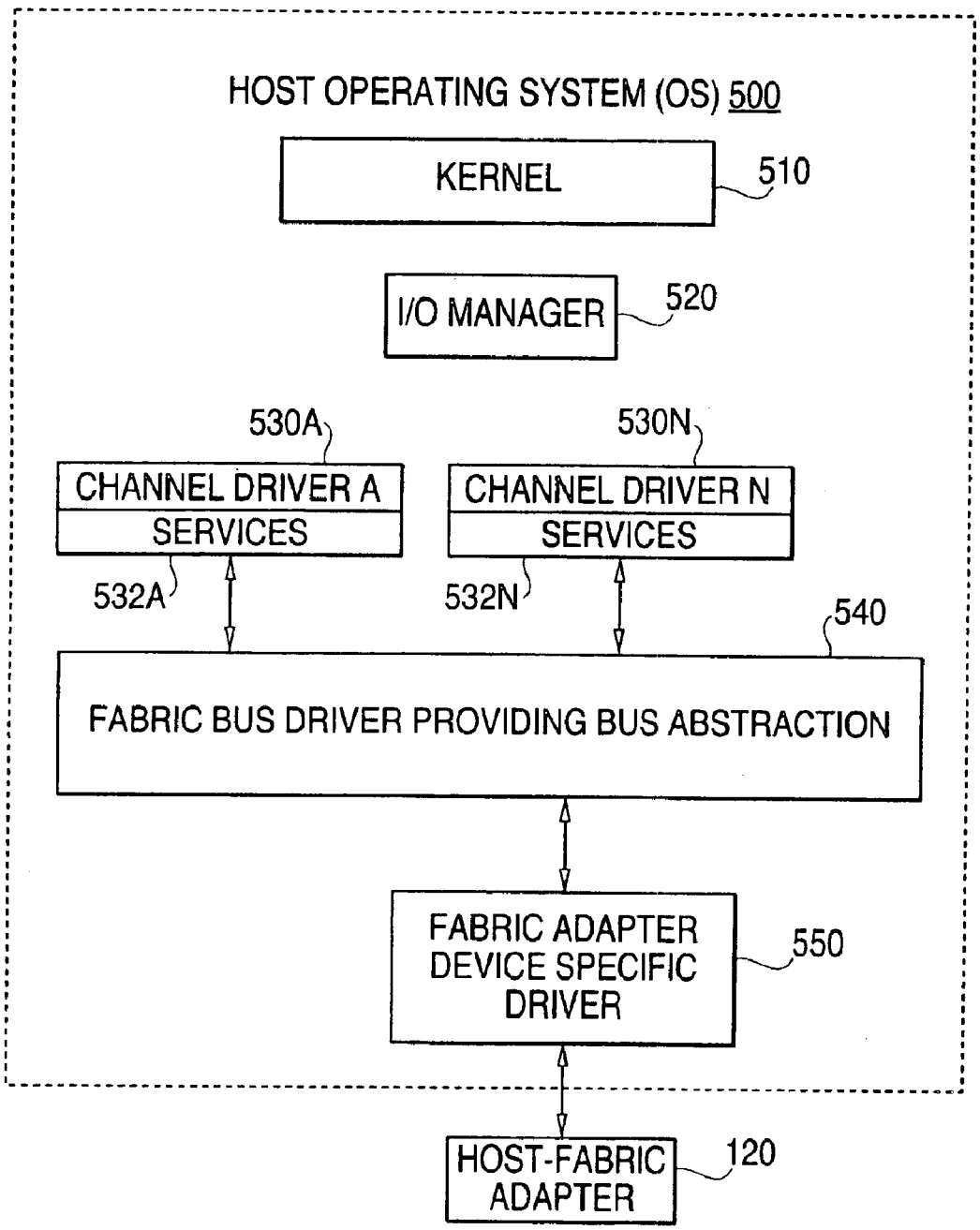
FIG. 5 illustrates an example software driver stack of an operating system (OS) of a host system according to an embodiment of the present invention.

FIG. 5 illustrates an example software driver stack of a host system 130. As shown in FIG. 5, a host operating system (OS) 500 may include a kernel 510, an I/O manager 520, a plurality of channel drivers 530A–530N for providing an interface to various I/O controllers, and a host-fabric adapter software stack (driver module) including a fabric bus driver 540 and one or more fabric adapter device-specific drivers 550A–550N utilized to establish communication with devices attached to the switched fabric 100' (e.g., I/O controllers), and perform functions common to most drivers. Such a host operating system (OS) 500 may be Windows 2000, for example, and the I/O manager 520 may be a Plug-n-Play manager.

Channel drivers 530A–530N provide the abstraction necessary to the host operating system (OS) to perform IO operations to devices attached to the switched fabric 100', and encapsulate IO requests from the host operating system (OS) and send the same to the attached device(s) across the switched fabric 100'. In addition, the channel drivers 530A–530N also allocate necessary resources such as memory and Work Queues (WQ) pairs, to post work items to fabric-attached devices.

The host-fabric adapter software stack (driver module) may be provided to access the switched fabric 100' and information about fabric configuration, fabric topology and connection information. Such a host-fabric adapter software stack (driver module) may be utilized to establish communication with a remote system (e.g., I/O controller), and perform functions common to most drivers, including, for example, host-fabric adapter initialization and configuration, channel configuration, channel abstraction, resource management, fabric management service and operations, send/receive IO transaction messages, remote direct memory access (RDMA) transactions (e.g., read and write operations), queue management, memory registration, descriptor management, message flow control, and transient error handling and recovery. Such a host software module may be written using high-level programming languages such as C, C++ and Visual Basic, and may be provided on a computer tangible medium, such as memory devices; magnetic disks (fixed, floppy, and removable); other magnetic media such as magnetic tapes; optical media such as CD-ROM disks, or via Internet downloads, which may be available for a fabric administrator to conveniently plug-in or download into an existing operating system (OS). Such a host software module may also be bundled with the existing operating system (OS) which may be activated by a particular device driver.

The host-fabric adapter (otherwise, known as host channel adapter "HCA") driver module may consist of three functional layers: a HCA services layer (HSL), a HCA abstraction layer (HCAAL), and a HCA device-specific driver (HDSD) in compliance with the "*Next Generation I/O Architecture: Host Channel Adapter Software Specification*", the "*Next Generation I/O: Intel HCA Connection Services Layer High Level Design*", the "*Next Generation I/O: Intel HCA Abstraction Layer High Level Design*", and the "*Next Generation I/O: Intel HCA Fabric Services Layer High Level Design*" as set forth by Intel on Aug. 6, 1999 For instance, inherent to all channel drivers 530A–530N may be a Channel Access Layer (CAL) including a HCA Service Layer (HSL) for providing a set of common services 532A–532N, including fabric services, connection services, and HCA services required by the channel drivers 530A–530N to instantiate and use NGIO/InfiniBand™ protocols for performing data transfers over NGIO/InfiniBand™ channels. The fabric bus driver 540 may correspond to the HCA Abstraction Layer (HCAAL) for managing all of the device-specific drivers, controlling shared resources common to all HCAs in a host system 130 and resources specific to each HCA in a host system 130, distributing event information to the HSL and controlling access to specific device functions. Likewise, one or more fabric adapter device-specific drivers 550A–550N may correspond to HCA device-specific drivers (for all type of brand X devices and all type of brand Y devices) for providing an abstract interface to all of the initialization, configuration and control interfaces of one or more HCAs. Multiple HCA device-specific drivers may be present when there are HCAs of different brands of devices in a host system 130.

More specifically, the fabric bus driver 540 or the HCA Abstraction Layer (HCAAL) may provide all necessary services to the host-fabric adapter software stack (driver module), including, for example, to configure and initialize the resources common to all HCAs within a host system, to coordinate configuration and initialization of HCAs with the HCA device-specific drivers, to control access to the resources common to all HCAs, to control access the resources provided by each HCA, and to distribute event notifications from the HCAs to the HCA Services Layer (HSL) of the Channel Access Layer (CAL). In addition, the fabric bus driver 540 or the HCA Abstraction Layer (HCAAL) may also export client management functions, resource query functions, resource allocation functions, and resource configuration and control functions to the HCA Service Layer (HSL), and event and error notification functions to the HCA device-specific drivers. Resource query functions include, for example, query for the attributes of resources common to all HCAs and individual HCA, the status of a port, and the configuration of a port, a work queue pair (WQP), and a completion queue (CQ).

Resource allocation functions include, for example, reserve and release of the control interface of a HCA and ports, protection tags, work queue pairs (WQPs), completion queues (CQs). Resource configuration and control functions include, for example, configure a port, perform a HCA control operation and a port control operation, configure a work queue pair (WQP), perform an operation on the Send or Receive Queue of a work queue pair (WQP), configure a completion queue (CQ), and perform an operation on a completion queue (CQ).

The host system 130 may communicate with one or more remote systems 150, 170 and 190, including I/O units and I/O controllers (and attached I/O devices) which are directly attached to the switched fabric 100' (i.e., the fabric-attached I/O controllers) using a Virtual Interface (VI) architecture in compliance with the "*Virtual Interface (VI) Architecture Specification, Version 1.0*," as set forth by Compaq Corp., Intel Corp., and Microsoft Corp., on Dec. 16, 1997. VI architecture comprises four basic components: Virtual Interface (VI) in which work requests are posted to describe data movement operation and location of data to be moved for processing and/or transportation via a switched fabric 100', VI consumer which may be an application program, VI provider which may be hardware and software components responsible for instantiating VI, and completion queue (CQ). VI is the mechanism that allows VI consumer to directly access VI provider. Each VI represents a communication endpoint, and endpoint pairs may be logically connected to support bi-directional, point-to-point data transfers over one or more designated channels of a data network. Under the VI architecture, the host-fabric adapter 120 and VI Kernel agent may constitute the VI provider to perform endpoint virtualization directly and subsume the tasks of multiplexing, de-multiplexing, and data transfer scheduling normally performed by the host operating system (OS) kernel 510 and device specific driver 4550A–550N as shown in FIG. 5. However, other architectures may also be used to implement the present invention. The term "VI" as set forth in the "*Virtual Interface (VI) Architecture Specification*" may also be known as work queue pair (WQP) as set forth in the "*Next Generation Input/Output (NGIO) Specification*" or simply as queue pair (QP) as set forth in the "InfiniBand™ Architecture Specification." Therefore, "VI", "WQP" and "QP" are interchangeable herein below.

Figure 6:
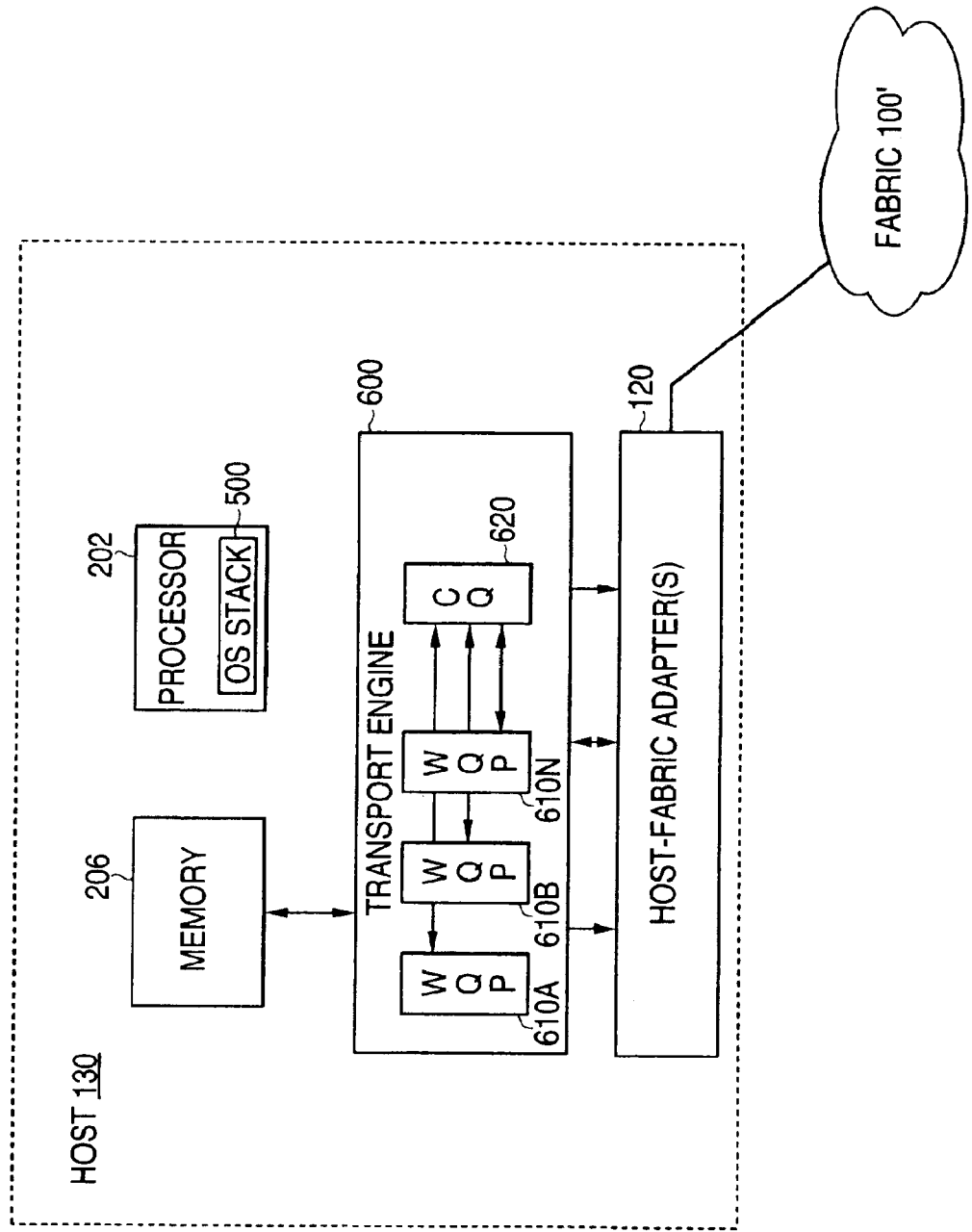
FIG. 6 illustrates a block diagram of an example host system using NGIO/InfiniBand™ and VI architectures to support data transfers via a switched fabric according to an embodiment of the present invention.

FIG. 6 illustrates an example host system using NGIO/InfiniBand™ and VI architectures to support data transfers via a switched fabric 100'. As shown in FIG. 6, the host system 130 may include, in addition to one or more processors 202 containing an operating system (OS) stack 500, a host memory 206, and at least one host-fabric adapter (HCA) 120 as shown in FIGS. 2, 4A–4B and 5, a transport engine 600 provided in the host-fabric adapter (HCA) 120 in accordance with NGIO/InfiniBand™ and VI architectures for data transfers via a switched fabric 100'. One or more host-fabric adapters (HCAs) 120 may be advantageously utilized to expand the number of ports available for redundancy and multiple switched fabrics.

As shown in FIG. 6, the transport engine 600 may contain a plurality of work queues (WQ) formed in pairs including a Receive Queue ("RQ" for inbound requests) and a Send Queue ("SQ" for outbound requests), such as work queue pairs (WQP) 610A–610N in which work requests "WQEs" may be posted to describe data movement operation and location of data to be moved for processing and/or transportation via a switched fabric 100', and completion queues (CQ) 620 may be used for the notification of work request completions. Alternatively, such a transport engine 600 may be hardware memory components of a host memory 206 which resides separately from the host-fabric adapter (HCA) 120 so as to process completions from multiple host-fabric adapters (HCAs) 120, or may be provided as part of kernel-level device drivers of a host operating system (OS). All work queues (WQs) may share physical ports into a switched fabric 100' via one or more host-fabric adapters (HCAs) 120.

Each work queue pair (WQP) can be programmed with various sized WQEs. Each WQE may be accessed to obtain control data supplied within. One of the control fields in the WQE may be a Data Segment. Data Segments are scatter gather lists pointing to memory regions of system memory 206 where message data is to be transmitted from or where incoming message data is to be written thereto. WQEs can contain various amounts of Data Segments as long as the total does not exceed the programmed size of the WQE.

The Send Queue ("SQ" for outbound requests) of the work queue pair (WQP) may be used to as an "initiator" which requests, for example, normal message sends to remote VIs, remote direct memory access "RDMA" reads which request messages to be read from specific memory locations of a target system, via a switched fabric 100', and remote direct memory access "RDMA" writes which request messages to be written onto specific memory locations of a target system, via a switched fabric 100', as described with reference to FIGS. 3A–3D.

The Receive Queue ("RQ" for inbound requests) of the work queue pair (WQP) may be used as a "responder" which receives requests for messages from normal sends, RDMA reads and RDMA writes from a target system, via a switched fabric 100', as described with reference to FIGS. 3A–3D.

In such an example data network, NGIO/InfiniBand™ and VI hardware and software may be used to support data transfers between two memory regions, often on different systems, via a switched fabric 100'. Each host system may serve as a source (initiator) system which initiates a message data transfer (message send operation) or a target system of a message passing operation (message receive operation). Examples of such a host system include host servers providing a variety of applications or services and I/O units providing storage oriented and network oriented IO services. Work requests in the form of "WQEs" (data movement operations such as message send/receive operations and RDMA read/write operations) may be posted to work queue pairs (WQPs) 610A–610N associated with a given fabric adapter (HCA), one or more channels may be created and effectively managed so that requested operations can be performed.

Figure 7:
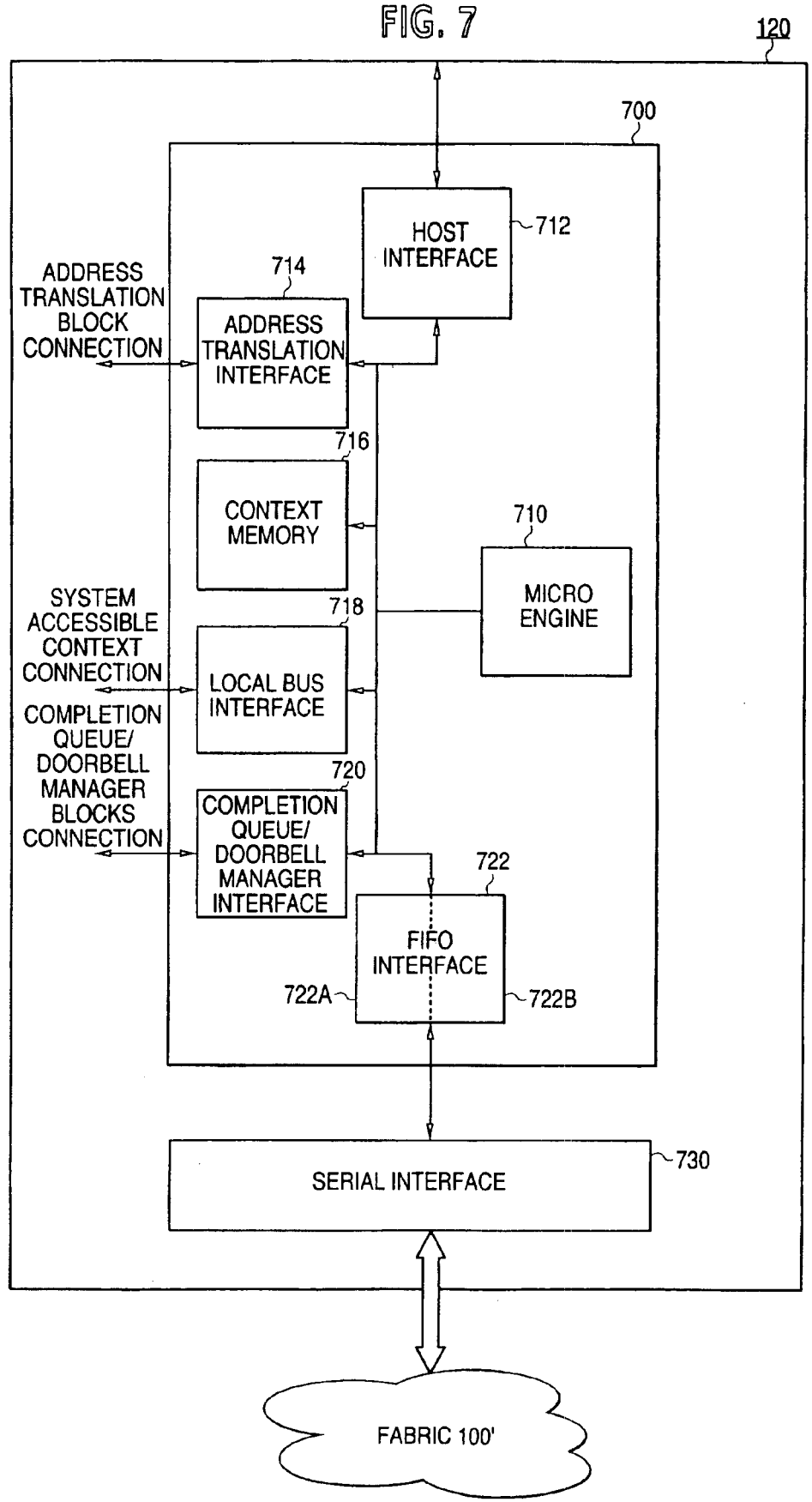
FIG. 7 illustrates an example host-fabric adapter configured in accordance with NGIO/InfiniBand™ and VI architectures to support data transfers via a switched fabric 100' according to an embodiment of the present invention.

Turning now to FIG. 7, an example host-fabric adapter 120 installed at a host system and configured in accordance with NGIO/InfiniBand™ architectures to support data transfers via a switched fabric 100' according to an embodiment of the present invention is illustrated. The example host-fabric adapter 120 is especially designed to connect a host system to a channel-based switched fabric 100' of a data network 100 for services to efficiently establish and manage NGIO/InfiniBand™ channels and support data movement operations between communication devices at a host system or between host systems connected together directly or via the data network 100' using a channel-based, switched fabric architecture. In addition, the host-fabric adapter 120 implements hardware designed for increased performance and efficiency, and optimized for, but not limited thereto, NGIO/InfiniBand™ applications with minimal hardware investment, including controlling execution of NGIO/InfiniBand™ protocols with minimal pipelining and NGIO/InfiniBand™ data processing with minimal latency.

As shown in FIG. 7, the host-fabric adapter 120 may include a micro-controller subsystem 700 which controls the execution of the NGIO/InfiniBand™ protocols, and a serial interface 730 which provides an interface with the switched fabric 100', typically via hardware SERDES (serializer/deserializer device). Both the micro-controller subsystem 700 and the serial interface 730 may be implemented as Application Specific Integrated Circuits (ASICs) of the host-fabric adapter 120.

The micro-controller subsystem 700 contains one or more independent programmable direct-memory-access (DMA) engine(s) known as Micro-Engine (ME) 710 utilized to build, send, receive and acknowledge NGIO/InfiniBand™ packets between the host memory 206 (see FIG. 6) and a serial link, and special purpose hardware interface logic blocks such as a host interface 712, an address translation interface 714, a context memory interface 716, a local bus interface 718, a completion queue/doorbell manager interface 720, and a first-in/first-out (FIFO) interface 722 controlled by the Micro-Engine (ME) 710 to perform many ME functions needed to implement the NGIO/InfiniBand™ and VI specifications, including, for example, host transactions, context updates, physical address translations, host descriptor fetches, doorbell management, FIFO data movements and completion queue (CQ) management.

The Micro-Engine (ME) 710 may execute MicroCode to coordinate Send Queue (SQ) and Receive Queue (RQ) operations for transmitting and receiving NGIO/InfiniBand™ packets and to support completion queues (CQ) and channels in compliance with the NGIO/InfiniBand™ protocols. The Micro-Engine (ME) 710 may also control all the interface blocks through a set of micro register reads and writes. Micro registers may be available with data supplied by multiple interface blocks to help speed up ME functions. Typically the Micro-Engine (ME) 710 that controls the Send Queue (SQ) may be referred to SQ Micro-Engine (ME), and likewise, the Micro-Engine (ME) 710 that controls the Receive Queue (RQ) may be referred to RQ Micro-Engine (ME).

The host interface 712 provides an interface to either an I/O bus 205 of a host system 130 as shown in FIG. 4A, or an I/O and memory controller 204 of a host system 130 as shown in FIG. 4B for work requests, in the form of Work Queue Elements "WQEs" as shown in FIG. 3B–3C from the host system 130 for data transactions, including controlling arbitration and data/control multiplexing between different requesters, read and write transactions to the host system 130 and facilitating read completions.

The address translation interface 714 provides an interface to an address translation block (ATB) (not shown) responsible for managing the conversion of virtual address (used to address program space) to physical addresses (used to address system space) using a system memory Translation and Protection Table (TPT), and validating access to system memory for different transaction types (Write, RDMA Read and RDMA Write). In one example implementation, the host memory 206 may contain up to $2^{27}$ (128 million) 4 KByte pages wherein each system memory page can be mapped anywhere within up to 16 Tera Bytes of system memory address space. Each system memory page may also be accessed by an entry within the Translation and Protection Table (TPT) which contains information such as, for example, a 4 KByte page number corresponding to the physical address, memory protection attributes (RDMA Write Enable, RDMA Read Enable, Local Memory Write Enable) and Protection Domain (PD) whose value is matched with the value assigned to the initiator of the translation request (the Work Queue Pair requesting the translation).

The context memory interface (CMI) 716 provides an interface to a context manager (not shown) responsible for providing necessary context information for a "VI" or a work queue pair "WQP" used for sending and receiving NGIO/InfiniBand™ packets. The context information contains all the control, status and information necessary for all types of data transfer operations. The context memory interface 716 also provides an interface to host software and presents different types of memory mapped register sets which specify channel configurations and to initiate channel operations. For example, the memory mapped register sets may include global HCA context registers which affect the operation of Send Queue (SQ) and Work Queue (WQ), work queue pair (WQP) registers which control the establishment of channels, and completion queue (CQ) registers which specify the location and length of a completion queue (CQ) in host memory 206 and control whether interrupts are generated when completion queue (CQ) entries are written.

The local bus interface 718 provides an interface to a local bus responsible for supporting system accessible context connections and channel operations, and turning the signal data into appropriate forms for the Micro-Engine (ME) 710. Typically, the local bus interface 718 contains a local bus controller (DLB) (not shown) for handling reads and writes on the local bus that access local bus registers, including "WQE" Mask Register from the Micro-Engine (ME) 710. Such a local bus controller (DLB) is also responsible for MicroCode loading.

The completion queue/doorbell manager interface 720 provides an interface to completion queue (CQ) engine, and doorbell manager and memory registration rules of the VI architecture. Completion queue (CQ) engine (not shown) is responsible for posting global events and completion queue (CQ) entries. Doorbell manager (not shown) is responsible for keeping track of the number of outstanding work requests. For example, the doorbell manager (not shown) may be configured to update the work queue (WQ) for a specific VI and update the next descriptor address if required, and check for several error conditions during the context memory update and report their status to the application software.

The FIFO interface 722 provides an interface to the serial interface 730. The FIFO interface 722 may include a Receive FIFO interface 722A arranged to receive request(s) and/or data packet(s) from the switched fabric 100' via a Receive FIFO and a serial interface 730, and a Transmit FIFO interface 722B arranged to send request(s) and/or data packet(s) to the switched fabric 100' via a Transmit FIFO and a serial interface 730.

The Receive FIFO interface 722A may be used by the Micro-Engine (ME) 710 to process incoming data packets, via the serial interface 730, including checking the header of each packet as shown in FIG. 3A for errors and checking if additional data needs to be read before passing the same to the host interface 712. The Transmit FIFO interface 722B may be used by the Micro-Engine (ME) 710 to build data packets for subsequent transmission, via the serial interface 730.

In addition, a Scheduler (not shown) may also be included for scheduling the next Virtual Interface (VI) to the context manager and supporting priority of traffic for data packets associated with Send Queue (SQ) and Receive Queue (RQ) of the work queue pair (WQP). Such a Scheduler may be provided to interface with the context memory interface 716, the local bus interface 718 and the completion queue/doorbell manager interface 720 for scheduled functions.

Figure 8:
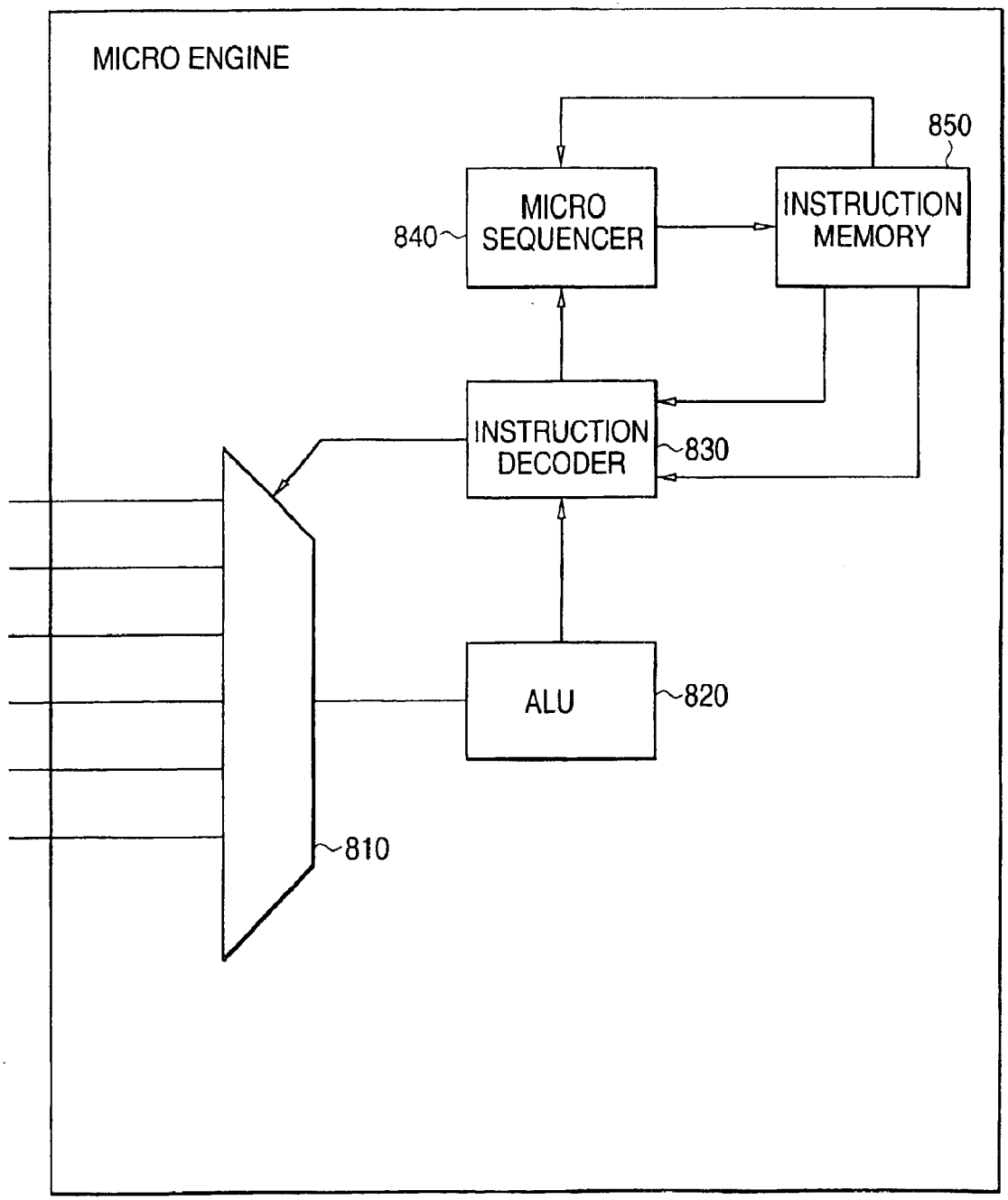
FIG. 8 illustrates an example Micro-Engine (ME) of a host-fabric adapter according to an embodiment of the present invention.

FIG. 8 illustrates an example Micro-Engine (ME) 710 configured to handle one of Send Queue and Receive Queue operations, including multiple independent operations (known as tasks) for performance efficiency with minimum hardware investment according to an embodiment of the present invention. As shown in FIG. 8, the Micro-Engine (ME) 710 may comprise one or more Data Multiplexers (MUXs) 810, an Arithmetic Logic Unit (ALU) 820, an Instruction Decoder 830, a Micro-Sequencer 840, and an Instruction Memory 850. The Instruction Memory 850 may store downloadable MicroCode for ME instructions. The data MUXs 810 may supply appropriate interface data based on ME instructions. The Arithmetic Logic Unit (ALU) 820 may perform any mathematical, logical and shifting operations. The Instruction Decoder 830 may supply system controls to the Micro-Sequencer 840 to determine the next instruction or address to be executed, execute ME instructions from the Instruction Memory 850, and determine the functions of the ALU 820. The Micro-Sequencer 840 may check the sequence of ME instructions and determine which next instruction is to be executed by the Instruction Decoder 820.

Figure 9:
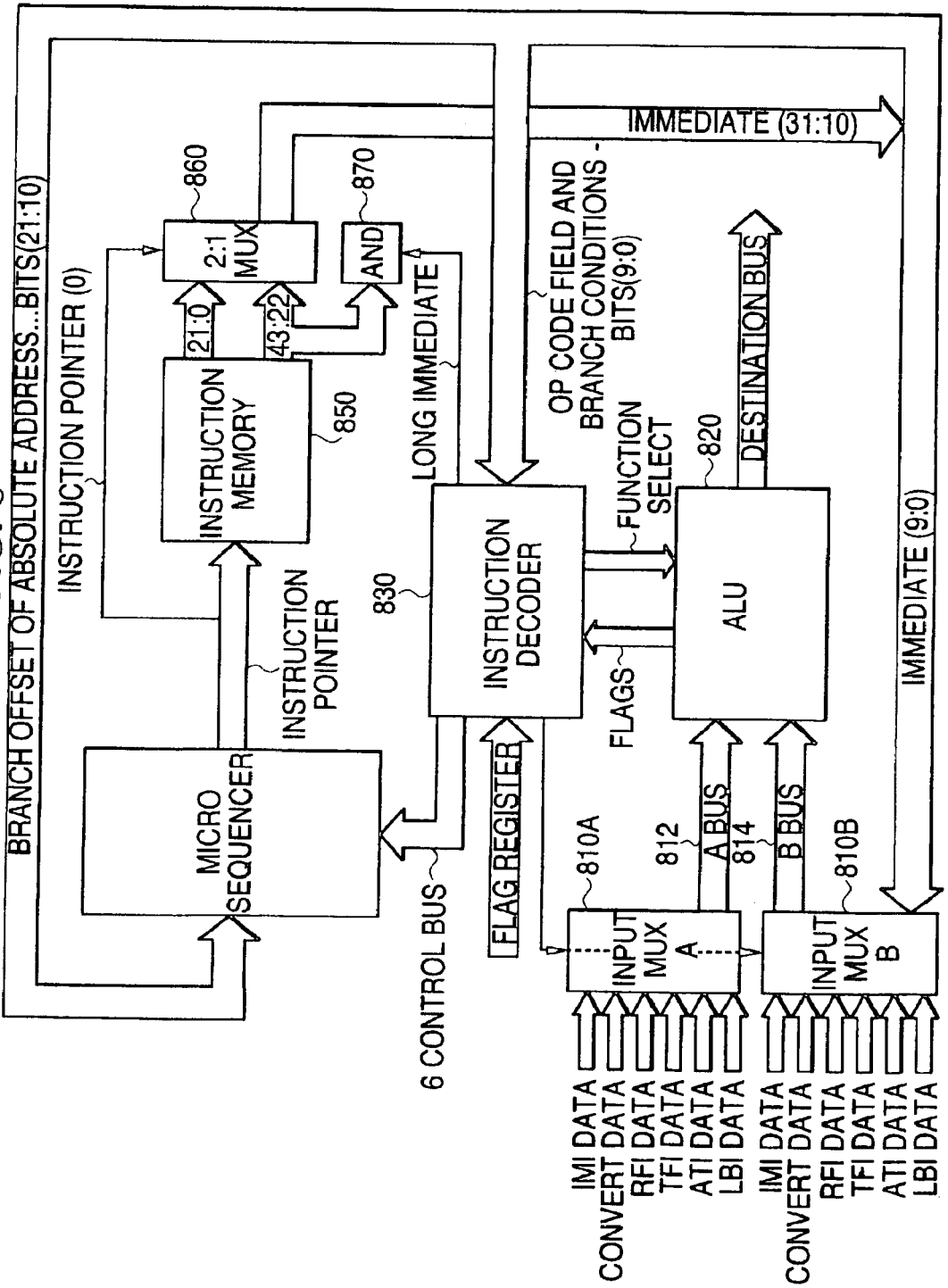
FIG. 9 illustrates an example implementation of a Micro-Engine (ME) of a host-fabric adapter according to an embodiment of the present invention.

One example implementation of the data MUXs 810, the Arithmetic Logic Unit (ALU) 820, the Instruction Decoder 830, the Micro-Sequencer 840, and the Instruction Memory 850 of an example Micro-Engine (ME) 710 may be described with reference to FIG. 9 herein below:

Data MUX 810: There may be two input data MUXs, input MUX-A 810A and input MUX-B 810B which supply two 32-bit buses (A-bus and B-bus) inputs to the ALU 820. The A-bus 812 may supply data based on decode of the destination field of the ME instruction to the ALU 820. Likewise, the B-bus 814 may supply data based on decode of the source field of the ME instruction to the ALU 820. The data inputs to the input data MUXs 810A and 810B may be supplied by external interface blocks such as the host interface 712, the address translation interface 714, the VI context memory interface 716, the local bus interface 718, the completion queue/doorbell manager interface 720, and the first-in/first-out (FIFO) interface 722 needed to control ME functions. The input MUX-B 810B may include Immediate Data from the ME instruction, via 2:1 Multiplexer (MUX) 860 and logic AND gate 870. The decode of the destination/source field, which generate the selects for the input MUX-A 810A and MUX-B 810B, may be executed by the Instruction Decoder 830.

Arithmetic Logic Unit (ALU) 820: The ALU 820 may contain two (A and B) 32-bit data inputs and perform functions that are based on the OpCode field of the ME instruction. The functions supported include, but are not limited to, Add, Subtract, OR, XOR, AND, Compare, Rotate Right, Shift Left, Bit test and Move (pass through). The Instruction Decoder 830 decodes the ME instruction and provides the function select signals to the ALU 820. After executing the selected function, the ALU 820 sets flags based on the outcome. The flags may include, for example, Zero and Carry. If the result of an arithmetic function is zero, the Z flag may be set. In contrast, if the arithmetic function results in a carry out, the C flag may be set. Results of ALU functions may affect the state of the Z flag.

Instruction Memory 850: The Instruction Memory 850 may be a static random-access-memory SRAM provided to store MicroCode for providing ME instructions via 2:1 Multiplexer (MUX) 860 and logic AND gate 870. Micro-Code may be downloadable into the SRAM for changes in future NGIO/InfiniBand™ specification enhancements. The SRAM may contain 2K×44 bits and may be loaded via the local bus. Each ME instruction may be 22 bits, for example, and two instructions may be allowed for each word of SRAM. Instructions with 32 bit Immediate Data occupy 44 bits, counting as two instructions. The MicroCode supplied by the SRAM may be available in different code formats.

Micro-Sequencer 840: The Micro-Sequencer 840 may determine the address sequence of the Micro-Engine (ME) 710 from the decode of the ME instruction and Flag register information. The next address sequence may be controlled by the Instruction Decoder 830 which passes 8 bits of Control Field information (i.e., 8 Control Field signals) to the Micro-Sequencer 840.

Major challenges implementing a host-fabric adapter as shown in FIG. 7 are to maximize performance and resources of the Micro-Engine (ME) 710 in processing NGIO/InfiniBand™ packets and to optimize memory bandwidth while preserving the overall transfer rate. Specialized Hardware Assist (HWA) logic may be incorporated into one or more special purpose hardware interface blocks, such as the host interface 712, the address translation interface 714, the VI context memory interface 716, the local bus interface 718, the completion queue/doorbell manager interface 720, and the FIFO interface 722 so as to assist their respective interface functions and to help offloading the Micro-Engine (ME) 710 from hardware calculations in processing NGIO/InfiniBand™ packets. QP context information which is stored in a context memory (i.e., random-access-memory "RAM") of the context memory interface 716 for sending and receiving NGIO/InfiniBand™ packets may need to be updated during ME cycles in such a way as to optimize memory bandwidth and preserve the overall data transfer rate. Typically such QP context information may be updated to provide all the control, status and information necessary for all types of data transfer operations. The context memory is always updated with latest values of QP context information, and the Micro-Engine (ME) 710 accesses to the latest values of that QP context information to do work (data movement operations such as message send/receive operations and RDMA read/write operations).

Figure 10:
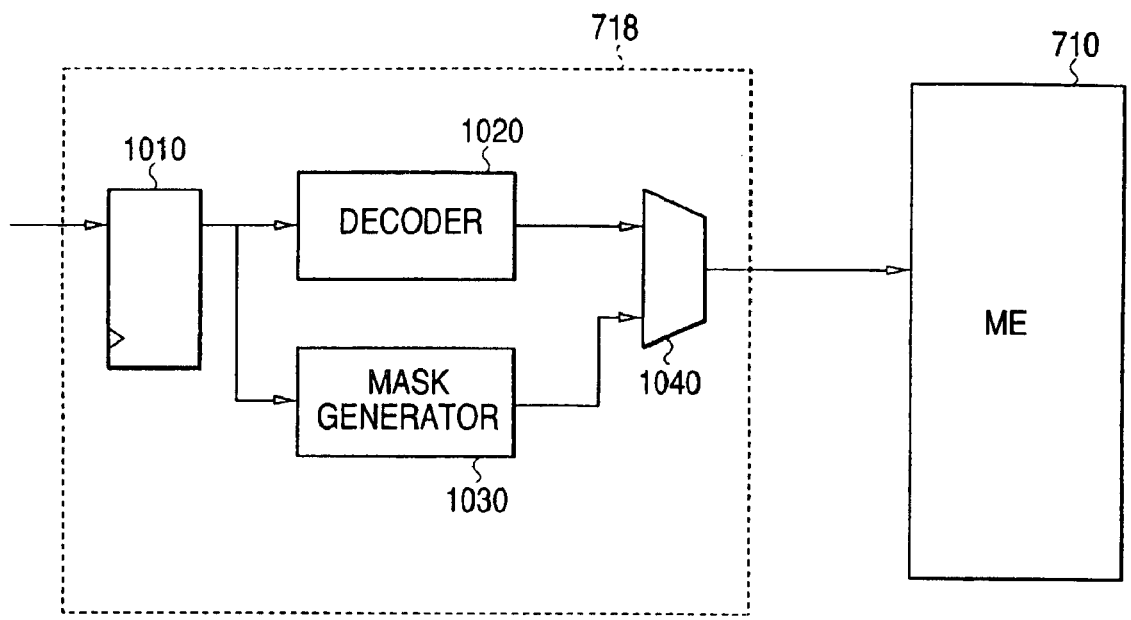
FIG. 10 illustrates an example work queue entry (WQE) ring hardware assist (HWA) mechanism according to an embodiment of the present invention.

More specifically, FIG. 10 illustrates an example work queue entry (WQE) ring Hardware Assist (HWA) Mechanism according to an embodiment of the present invention. Such a work queue entry (WQE) ring Hardware Assist (HWA) Mechanism may be incorporated into a local bus interface 718 in order to efficiently determine the starting address of a work queue element "WQE" posted on an appropriate work queue (WQ) for the Micro-Engine (ME) 710 to process the requested data transfer operation with higher throughput and lower latency. Alternatively, the work queue entry (WQE) ring Hardware Assist (HWA) Mechanism may also be incorporated into the context memory interface 716 in order to determine the starting address of a WQE posted on the work queue (WQ). When the starting address of a "WQE" is determined, the Micro-Engine (ME) 710 may proceed to access the control data supplied within the "WQE" so as to process the requested data transfer operation. "WQEs" are posted onto appropriate work queues (WQs) by the host software of the host system 130 to describe data transfer operations, via the switched fabric 100'. Such "WQEs" typically provide all the information needed to complete Send Queue and Receive Queue operations. The "WQEs" may be programmed by host software with different given sizes. Each "WQE" contains control fields having one or more Data Segments. The Data Segments of each "WQE" contain the Virtual Address (VA), the local key and the length and represent scatter gather lists pointing to memory regions of host system memory 206 where message data is to be transmitted from or where incoming message data is to be written as described with reference to FIGS. 3C–3D. "WQEs" can contain various amounts of Data Segments as long as the total does not exceed the host programmed size of the "WQE". The WQE size may be represented by a 2-bit binary code from the QP context information stored in the local bus interface 718 or in the context memory 716. The 2-bit WQE size may be "00" which indicates a 64 byte "WQE", "01" which indicates a 128 byte "WQE", "10" which indicates a 256 byte "WQE", and "11" which indicates a 512 byte "WQE". For each given WQE size, there may be a fixed number of Data Segments. For example, a 64 byte "WQE" may contain a single data segment. However, a 128 byte "WQE" may contain up to 5 data segments. Similarly, a 256 byte "WQE" may contain up to 13 data segments, and a 512 byte "WQE" may contain up to 29 data segments.

As shown in FIG. 10, the example work queue entry (WQE) ring Hardware Assist (HWA) Mechanism as incorporated into the local bus interface 718 contains several hardware assist logic, including a flip-flop 1010 arranged to receive programmed WQE size from QP context information; a decoder 1020 arranged to decode the WQE size and supply a decoded size value based on the programmed WQE size; a mask generator 1030 arranged to generate a WQE mask value based on the programmed WQE size; and a multiplexer (MUX) 1040 arranged to provide one of the decoded WQE size value and the WQE mask value for each work queue (WQ) to the Micro-Engine (ME) 710 for determining the starting address of a WQE posted on the work queue (WQ) regardless of the number of Data Segments contained in the WQE. Only the decoder 1020 and the mask generator 1030 are required to supply the WQE size value and the WQE mask value to the Micro-Engine (ME) 710 for calculations. Both the flip-flop 1010 and the MUX 1040 are simply used for timing and synchronization.

Upon receipt of the WQE size value and the WQE mask value, the Micro-Engine (ME) 710 executes two ME instructions, a logical AND function of the WQE mask value (AND WQE_Off, WQE_Mask) and a logical ADD function of the WQE size value (ADD WQE_Off, WQE_Size) based on a current WQE offset indicating a current position of a WQE so as to determine the starting address of a next WQE posted on the work queue (WQ). The logical AND function provides a bit-wise add. For example, if either the WQE mask value or the WQE offset is zero "0", then the bit result is zero "0". In contrast to the logical AND function, the logical ADD function is simply a binary addition which follows the normal rule of adding a binary value. Factors involved in determining the starting address of a next WQE include programmed WQE size and the number of Data Segments in each WQE.

Figure 11:
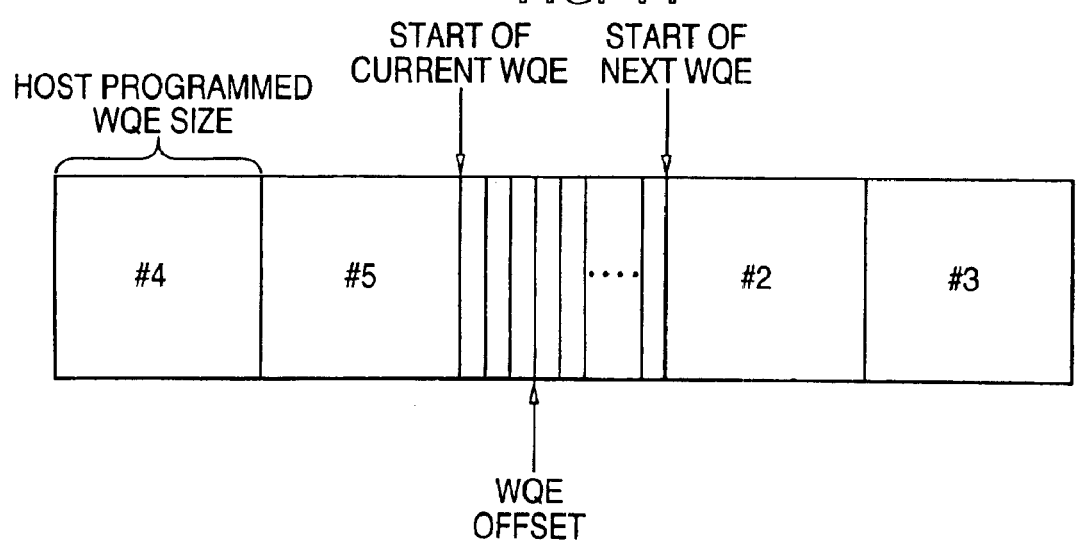
FIG. 11 illustrates an example WQE ring having multiple WQEs with relative positions of pointers used to calculate the starting address of a WQE according to an embodiment of the present invention.

FIG. 11 illustrates an example WQE ring with relative positions of pointers used to calculate the starting address of a WQE according to an embodiment of the present invention. The WQE ring 1100 may contain, for example, five (5) WQEs, WQE#1, WQE#2, WQE#3, WQE#4 and WQE#5. The number of WQEs is not limited thereto, however. In one example implementation, there may be up to 1024 WQEs available in the WQE ring 1100. As shown in FIG. 11, each WQE such as WQE#1 may contain multiple Data Segments. The WQE Offset represents a host software pointer which moves within the current WQE and indicates the relative position within the Data Segments of the WQE for which data message can be read from or written to. Typically, when a Queue Pair (QP) is created by host software, the WQE Offset of the current WQE is stored in the QP context information.

FIG. 12 illustrates an example mask generator of the WQE ring HWA Mechanism shown in FIG. 10. As shown in FIG. 12, the example mask generator 1030 may include a WQE Mask Register 1200 that is used to determine the starting address of the currently completed WQE in a WQE ring shown in FIG. 11. In one example implementation, the WQE Mask Register 1200 may contain 32 bits wherein the first 12 bits represent the work request mask value and the last 20 bits represent reserved "fill-in" bits in all "1s". However, the number of binary representation of the WQE Mask Register 1200 is not limited thereto. The WQE Mask Register 1200 may contain only 12-bit binary representation.

Depending upon the programmed WQE size, the WQE mask value supplied to the Micro-Engine (ME) 710, via the MUX 1040, may be different. For example, if the input 2-bit WQE size is "00", the WQE mask value supplied to the Micro-Engine (ME) 710 will be "1111 1100 0000" which is a 12-bit binary representation of a 64 byte WQE. If the input 2-bit WQE size is "01", the WQE mask value supplied to the Micro-Engine (ME) 710 will be "1111 1000 0000" which is a binary representation of a 128 byte WQE. Similarly, if the input 2-bit WQE size is "10", the WQE mask value supplied to the Micro-Engine (ME) 710 will be "1111 0000 0000" which is a binary representation of a 256 byte WQE. Lastly, if the input 2-bit WQE size is "11", the WQE mask value supplied to the Micro-Engine (ME) 710 will be "1110 0000 0000" which is a binary representation of a 512 byte WQE.

When the WQE mask value is determined, the Micro-Engine (ME) 710 executes a logical AND function of the current WQE offset address and the WQE mask value (AND WQE_Off, WQE_Mask) to determine the starting address of the currently completed WQE. Once the starting address of the currently completed WQE is determined by way of a new WQE offset value, the WQE size value may be added to the new WQE offset value by the Micro-Engine (ME) 710 in order to determine the starting address of the next WQE in the WQE ring shown in FIG. 11.

FIG. 13 illustrates an example decoder of the WQE ring HWA Mechanism shown in FIG. 10. As shown in FIG. 13, the example decoder 1020 may include a WQE Size Register 1300 that is used to determine the starting address of the next WQE in the WQE ring shown in FIG. 11. In one example implementation, the WQE Size Register 1300 may also contain 32 bits wherein the first 12 bits represent the work request size value and the last 20 bits represent reserved "fill-in" bits in all "0s". However, the number of binary representation of the WQE Size Register 1300 is not limited thereto.

Also, depending upon the programmed WQE size, the WQE size value supplied to the Micro-Engine (ME) 710, via the MUX 1040, may be different. For example, if the input 2-bit WQE size is "00", the WQE size value supplied to the Micro-Engine (ME) 710 will be "0000 0100 0000" which is a 12-bit binary representation of a 64 byte WQE. If the input 2-bit WQE size is "01", the WQE size value supplied to the Micro-Engine (ME) 710 will be "0000 1000 0000" which is a binary representation of a 128 byte WQE. Similarly, if the input 2-bit WQE size is "10", the WQE size value supplied to the Micro-Engine (ME) 710 will be "0001 0000 0000" which is a binary representation of a 256 byte WQE. Lastly, if the input 2-bit WQE size is "11", the WQE size value supplied to the Micro-Engine (ME) 710 will be "0010 0000 0000" which is a binary representation of a 512 byte WQE.

When the WQE size value is determined, the Micro-Engine (ME) 710 executes a logical ADD function of the current WQE offset address and the WQE size value (ADD WQE_Off, WQE_Size) to determine the starting address of a next WQE in a WQE ring shown in FIG. 11.

Alternatively, both the decoder 1020 and the mask generator 1030 of the WQE ring HWA Mechanism shown in FIG. 10 may be implemented using one or more look-up tables which map corresponding WQE mask value and WQE size value for different input WQE size programmed by the host software.

Figure 14:
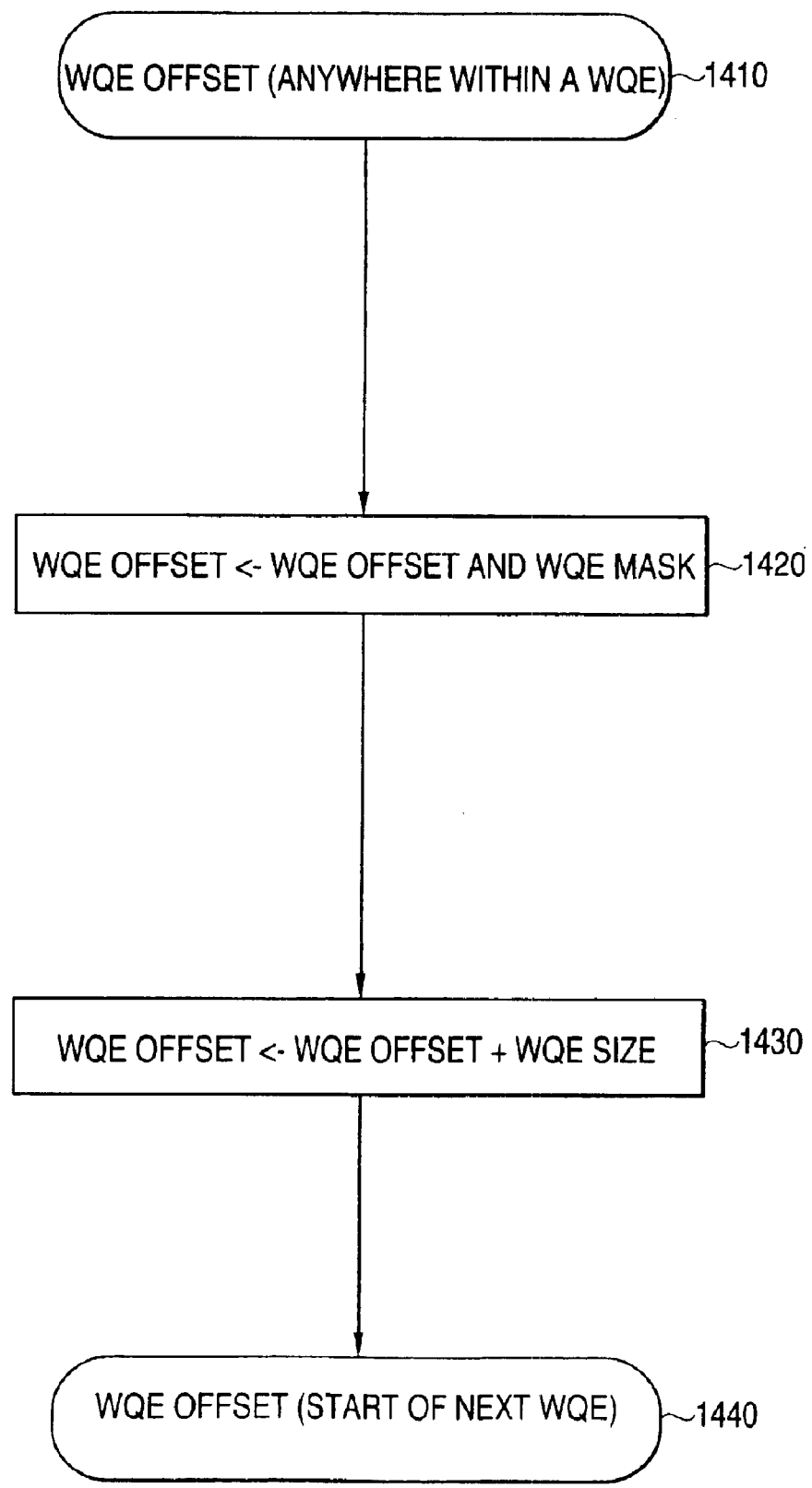
FIG. 14 illustrates an example ME process of determining the starting address of a WQE according to an embodiment of the present invention.

FIG. 14 illustrates an example Micro-Engine (ME) process of determining the starting address of a WQE according to an embodiment of the present invention. As shown in FIG. 14, the current WQE offset which may be anywhere within the current WQE is known to the Micro-Engine (ME) 710 at block 1410. For example, the current WQE Offset may correspond to "0010 1101 1000", a 12-bit binary representation as opposed to a 32-bit binary representation for purposes of simplicity.

If the 2-bit WQE size from the QP context is "10" indicating a 256 byte WQE in the WQE ring shown in FIG. 11, the Micro-Engine (ME) executes a logical AND function of the current WQE Offset and the WQE mask value of "1111 0000 0000" as shown in FIG. 12 in order to determine the starting address of the currently completed WQE at block 1420. The resultant WQE Offset after the logical AND function will be "0010 0000 0000".

Next, the Micro-Engine (ME) executes a logical ADD function of the resultant WQE Offset and the WQE size value of "0001 0000 0000" as shown in FIG. 13 in order to determine the starting address of the next WQE at block 1430. The resultant WQE Offset after the logical ADD function will be "0011 0000 0000" and will serve as the current WQE Offset for determining the starting address of another WQE at block 1440.

As described from the foregoing, the host-fabric adapter installed at a host system in a data network using a channel-based, switched fabric architecture according to an embodiment of the present invention effectively manages NGIO/InfiniBand™ channels and support data movement operations between communication devices at a host system or between host systems connected together directly or via a data network using a channel-based, switched fabric architecture. The host-fabric adapter is optimized for NGIO/InfiniBand™ functionality with minimal hardware investment, including controlling execution of NGIO/InfiniBand™ protocols with minimal pipelining. Micro-control subsystem of the host-fabric adapter is designed to control execution of NGIO/InfiniBand™ protocols with minimal pipelining. Also a WQE ring HWA mechanism is implemented to determine the starting address of each WQE in the WQE ring in order to enable the Micro-Engine (ME) to efficiently process outstanding data transactions (e.g., read/write operations) in such a data network, via a channel-based switched fabric. Such a WQE ring HWA mechanism advantageously calculates the starting address of the next WQE only in two (2) ME cycles as opposed to other techniques which may require approximately five (5) ME cycles best case and nine (9) ME cycles worst case. As a result, higher throughput and lower latencies may be achieved while executing logical functions of the WQE ring HWA mechanism. Since InfiniBand™ is a brand-new industry initiative, which is supported by Intel Corp. and other companies such as Compaq, HP and IBM. There are no hostadapter chips in the market, which support InfiniBand protocol. Therefore, there is no known methodology or hardware that exists today to deal with the WQE rings.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the present invention is applicable to all types of data networks, including, but is not limited to, a local area network (LAN), a wide area network (WAN), a campus area network (CAN), a metropolitan area network (MAN), a global area network (GAN) and a system area network (SAN) using Next Generation I/O (NGIO), Future I/O (FIO), InfiniBand™ and Server Net, and a LAN system including Ethernet, FDDI (Fiber Distributed Data Interface) Token Ring LAN, Asynchronous Transfer Mode (ATM) LAN, Fiber Channel, and Wireless LAN. Further, many other modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A host-fabric adapter, comprising:
   at least one Micro-Engine arranged to establish connections and support data transfer operations, via a switched fabric, in response to work requests that cause instructions in a form of work queue elements "WQEs" posted from a host system for said data transfer operations;
   a work queue element "WQE" hardware assist "HWA" mechanism arranged to determine the starting address of each work queue element "WQE" based on queue pair (QP) context information needed for said Micro-Engine (ME) to process work requests for said data transfer operations;
   a transport engine which contains a plurality of work queue pairs (WQPs) in which work requests in a form of work queue elements "WQEs" are posted to describe data transfer operations and locations of data to be moved for processing and/or transportation via said switched fabric;
   wherein said work queue pairs (WOPs) each comprises:
      a Send Queue (SQ) utilized as an "initiator" which requests normal message sends to remote Virtual Interfaces (VIs) of a remote system, remote direct memory access (RDMA) reads which request messages to be read from specific memory locations of said remote system, via said switched fabric, and remote direct memory access (RDMA) writes which request messages to be written onto specific memory locations of said remote system, via said switched fabric; and
      a Receive Queue utilized as a "responder" which receives requests for messages from normal sends, RDMA reads and RDMA writes from said remote system, via said switched fabric; and
   wherein said Micro-Engine and said work queue element "WQE" hardware assist "HWA" mechanism are configured in accordance with the "InfiniBand™ Specification", and implemented as part of an Application Specific Integrated Circuit (ASIC).

2. The host-fabric adapter as claimed in claim 1, further comprising:
   a local bus interface arranged to interface a local bus responsible for supporting system accessible context connections and channel operations, and turning signal data into appropriate forms for said Micro-Engine (ME) to process work requests for said data transfer operations; and
   a QP context memory arranged to store QP context information needed for said Micro-Engine (ME) to process work requests for data transfer operations.

3. A host-fabric adapter, comprising:
   at least one Micro-Engine arranged to establish connections and support data transfer operations, via a switched fabric, in response to work requests that cause instructions in a form of work queue elements "WQEs" posted from a host system for said data transfer operations;
   a work queue element "WQE" hardware assist "HWA" mechanism arranged to determine the starting address of each work queue element "WQE" based on queue pair (QP) context information needed for said Micro-Engine (ME) to process work requests for said data transfer operations;
   a local bus interface arranged to interface a local bus responsible for supporting system accessible context connections and channel operations, and turning signal data into appropriate forms for said Micro-Engine (ME) to process work requests for said data transfer operations; and
   a QP context memory arranged to store QP context information needed for said Micro-Engine (ME) to process work requests for data transfer operations;
   wherein said work queue element "WQE" hardware assist "HWA" mechanism is incorporated in one of said local bus interface and said QP context memory to determine the starting address of each work queue element "WQE" in the WQE ring, and said "WQEs" are programmed by host software with different given sizes including multiple Data Segments which are scatter gather lists pointing to memory regions of host system memory where message data is to be transmitted from or where incoming message data is to be written.

4. The host-fabric adapter as claimed in claim 3, further comprising a transport engine which contains a plurality of work queue pairs (WQPs) in which work requests in a form of work queue elements "WQEs" are posted to describe data transfer operations and locations of data to be moved for processing and/or transportation via said switched fabric.

5. The host-fabric adapter as claimed in claim 4, wherein said work queue pairs (WQPs) each comprises:
   a Send Queue (SQ) utilized as an "initiator" which requests normal message sends to remote Virtual Interfaces (VIs) of a remote system, remote direct memory access (RDMA) reads which request messages to be read from specific memory locations of said remote system, via said switched fabric, and remote direct memory access (RDMA) writes which request messages to be written onto specific memory locations of said remote system, via said switched fabric; and
   a Receive Queue utilized as a "responder" which receives requests for messages from normal sends, RDMA reads and RDMA writes from said remote system, via said switched fabric.

6. The host-fabric adapter as claimed in claim 3, wherein said work queue element "WQE" hardware assist "HWA" mechanism comprises:
   a flip-flop arranged to receive programmed WQE size from QP context information;
   a decoder arranged to decode the WQE size and supply a decoded size value based on the programmed WQE size;
   a mask generator arranged to generate a WQE mask value based on the programmed WQE size; and
   a multiplexer (MUX) arranged to provide one of the decoded WQE size value and the WQE mask value for each work queue (WQ) to said Micro-Engine (ME) for determining the starting address of a WQE posted on the work queue (WQ) regardless of the number of Data Segments contained in the WQE.

7. The host-fabric adapter as claimed in claim 6, wherein said mask generator includes a WQE Mask Register used to determine the starting address of the currently completed WQE in a WQE ring.

8. The host-fabric adapter as claimed in claim 6, wherein said decoder includes a WQE Size Register used to determine the starting address of the next WQE in the WQE ring.

9. The host-fabric adapter as claimed in claim 3, wherein said work queue element "WQE" hardware assist "HWA" mechanism comprises:
   a WQE Size Register arranged to decode programmed WQE size from QP context information and supply a decoded WQE size value; and
   a WQE Mask Register arranged to decode the programmed WQE size and supply a WQE mask value,
   wherein said Micro-Engine (ME) receives the decoded WQE size value and the WQE mask value for each work queue (WQ) and executes logical AND and logical ADD functions to determine the starting address of a WQE posted on the work queue (WQ) regardless of the number of Data Segments contained in the WQE.

10. The host-fabric adapter as claimed in claim 9, wherein said Micro-Engine (ME) determines the starting address of a WQE by:
   executing a logical AND function of a current WQE Offset and the WQE mask value to obtain a resultant WQE Offset indicating the starting address of the currently completed; and
   executing a logical ADD function of the resultant WQE Offset and the WQE size value to obtain a resultant WQE Offset indicating the starting address of the next WQE.

11. A host-fabric adapter installed at a host system for connecting to a switched fabric of a data network, comprising:
   at least one Micro-Engine (ME) arranged to establish connections and support data transfers via said switched fabric;
   a serial interface arranged to receive and transmit data packets from said switched fabric for data transfer operations;
   a host interface arranged to receive and transmit work requests that cause instructions in a form of work queue elements "WQEs" posted from said host system for data transfer operations;
   a local bus interface arranged to interface a local bus responsible for supporting system accessible context connections and channel operations, and turning signal data into appropriate forms for said Micro-Engine (ME) to process work requests for said data transfer operations; a QP context memory arranged to store QP context information needed for said Micro-Engine (ME) to process work requests for data transfer operations; and
   a work queue element "WQE" hardware assist "HWA" mechanism arranged to determine the starting address of each work queue element "WQE" based on queue pair (QP) context information needed for said Micro-Engine (ME) to process work requests for said data transfer operations.

12. The host-fabric adapter as claimed in claim 11, wherein said work queue element "WQE" hardware assist "HWA" mechanism is incorporated in one of said local bus interface and said QP context memory to determine the starting address of each work queue element "WQE" in the WQE ring, and said "WQEs" are programmed by host software with different given sizes including multiple Data Segments which are scatter gather lists pointing to memory regions of host system memory where message data is to be transmitted from or where incoming message data is to be written.

13. The host-fabric adapter as claimed in claim 12, wherein said work queue element "WQE" hardware assist "HWA" mechanism comprises:
   a flip-flop arranged to receive programmed WQE size from QP context information;
   a decoder arranged to decode the WQE size and supply a decoded size value based on the programmed WQE size;
   a mask generator arranged to generate a WQE mask value based on the programmed WQE size; and
   a multiplexer (MUX) arranged to provide one of the decoded WQE size value and the WQE mask value for each work queue (WQ) to said Micro-Engine (ME) for determining the starting address of a WQE posted on the work queue (WQ) regardless of the number of Data Segments contained in the WQE.

14. The host-fabric adapter as claimed in claim 13, wherein said mask generator includes a WQE Mask Register used to determine the starting address of the currently completed WQE in a WQE ring.

15. The host-fabric adapter as claimed in claim 13, wherein said decoder includes a WQE Size Register used to determine the starting address of the next WQE in the WQE ring.

16. The host-fabric adapter as claimed in claim 12, wherein said work queue element "WQE" hardware assist "HWA" mechanism comprises:
   a WQE Size Register arranged to decode programmed WQE size from QP context information and supply a decoded WQE size value; and
   a WQE Mask Register arranged to decode the programmed WQE size and supply a WQE mask value,
   wherein said Micro-Engine (ME) receives the decoded WQE size value and the WQE mask value for each work queue (WQ) and executes logical AND and ADD functions to determine the starting address of a WQE posted on the work queue (WQ) regardless of the number of Data Segments contained in the WQE.

17. The host-fabric adapter as claimed in claim 16, wherein said Micro-Engine (ME) determines the starting address of a WQE by:
   executing a logical AND function of a current WQE Offset and the WQE mask value to obtain a resultant WQE Offset indicating the starting address of the currently completed; and
   executing a logical ADD function of the resultant WQE Offset and the WQE size value to obtain a resultant WQE Offset indicating the starting address of the next WQE.

18. A method of determining the starting address of a work queue element "WQE" in a WQE ring for-processing outstanding data transfer operations in a host-fabric adapter installed at a host system, comprising:
   generating a WQE size value based on a programmed WQE size from context information;
   generating a WQE mask value based on the programmed WQE size from the context information;

executing a logical AND function of a current WQE Offset obtained from the context information and the WQE mask value to supply a resultant WQE Offset indicating the starting address of the currently completed; and executing a logical ADD function of the resultant WQE Offset and the WQE size value to supply a resultant WQE Offset indicating the starting address of the next WQE.

19. A computer readable medium having computer-executable instructions for performing a method of determining the starting address of a work queue element "WQE" in a WQE ring so as to process outstanding data transfer operations in a host-fabric adapter installed at a host system, said method comprising:

generating a WQE size value based on a programmed WQE size from context information;

generating a WQE mask value based on the programmed WQE size from the context information;

executing a logical AND function of a current WQE Offset obtained from the context information and the WQE mask value to supply a resultant WQE Offset indicating the starting address of the currently completed; and executing a logical ADD function of the resultant WQE Offset and the WQE size value to supply a resultant WQE Offset indicating the starting address of the next WQE.

* * * * *